US012453545B2

(12) United States Patent
Zenz-Olson et al.

(10) Patent No.: US 12,453,545 B2
(45) Date of Patent: Oct. 28, 2025

(54) TENSIONABLE AND LOCKABLE SOFT SUTURE ANCHORS AND ANCHOR ARRAYS FOR ANATOMICAL ATTACHMENT OF SOFT TISSUE TO BONE

(71) Applicant: Integrity Orthopaedics, Inc., Orono, MN (US)

(72) Inventors: Zak Zenz-Olson, Ham Lake, MN (US); Nathaniel Van Tran, Lakeville, MN (US); Thomas A. Westling, Orono, MN (US); Howard W. Harris, Southlake, TX (US); David M. Crompton, St. Paul, MN (US); Patrick M. Connor, Charlotte, NC (US)

(73) Assignee: Integrity Orthopaedics, Inc., Maple Plain, MN (US)

( * ) Notice: Subject to any disclaimer, the term of this patent is extended or adjusted under 35 U.S.C. 154(b) by 692 days.

(21) Appl. No.: 17/679,934

(22) Filed: Feb. 24, 2022

(65) Prior Publication Data

US 2022/0378409 A1    Dec. 1, 2022

Related U.S. Application Data

(60) Provisional application No. 63/281,411, filed on Nov. 19, 2021, provisional application No. 63/231,143, (Continued)

(51) Int. Cl.
*A61B 17/04* (2006.01)

(52) U.S. Cl.
CPC .. *A61B 17/0401* (2013.01); *A61B 2017/0414* (2013.01)

(58) Field of Classification Search
CPC ........ A61B 17/0401; A61B 2017/0417; A61B 2017/0414; A61B 2017/0458;
(Continued)

(56) References Cited

U.S. PATENT DOCUMENTS 4,899,743 A    2/1990  Nicholson et al.
4,968,315 A   11/1990  Gatturna
(Continued)

FOREIGN PATENT DOCUMENTS

EP    3593730 A2    1/2020

OTHER PUBLICATIONS

International Search Report and Written Opinion dated Jul. 25, 2022 for International Application No. PCT/US2022/023926.

*Primary Examiner* — Dianne Dornbusch
(74) *Attorney, Agent, or Firm* — Seager, Tufte & Wickhem LLP

(57) ABSTRACT

Soft suture anchors are disclosed that can be formed into a pre-strung array with a common working suture. Each anchor includes the common working suture and a soft anchor member that is expandable when implanted. This allows first locking an individual anchor into a bone hole followed by tensioning the suture and independently locking the suture at the anchor. A first anchor is implanted through the tendon and the suture is locked. A second anchor is implanted a selected close distance from the first anchor, the working suture is tensioned between the first and second anchors, and the working suture is locked at the second anchor to create a single suture tensioned and locked stitch between the first and second anchor. This process is repeated for each anchor in the array.

14 Claims, 17 Drawing Sheets

Related U.S. Application Data filed on Aug. 9, 2021, provisional application No. 63/172,565, filed on Apr. 8, 2021.

(58) Field of Classification Search
CPC .... A61B 2017/0404; A61B 2017/0445; A61B 2017/0419; A61B 2017/0406; A61B 2017/0446; A61B 2017/0408; A61B 2017/0403

See application file for complete search history.

(56) References Cited

U.S. PATENT DOCUMENTS

| | | | |
|---|---|---|---|
| 5,041,129 A | 8/1991 | Hayhurst et al. | |
| 5,192,303 A | 3/1993 | Gatturna et al. | |
| 5,203,787 A | 4/1993 | Noblitt et al. | |
| 5,207,679 A | 5/1993 | Li | |
| 5,269,809 A | 12/1993 | Hayhurst et al. | |
| 5,403,348 A | 4/1995 | Bonutti | |
| 5,405,359 A | 4/1995 | Pierce | |
| 5,468,197 A | 11/1995 | Loeffler | |
| 5,584,835 A | 12/1996 | Greenfield | |
| 5,626,614 A | 5/1997 | Hart | |
| 5,669,935 A | 9/1997 | Rosenman et al. | |
| 5,683,418 A | 11/1997 | Luscombe et al. | |
| 5,725,557 A | 3/1998 | Gatturna et al. | |
| 5,728,100 A | 3/1998 | Skiba | |
| 5,741,300 A | 4/1998 | Li | |
| 5,810,848 A | 9/1998 | Hayhurst | |
| 5,891,168 A | 4/1999 | Thal | |
| 5,921,986 A | 7/1999 | Bonutti | |
| 5,948,002 A | 9/1999 | Bonutti | |
| 5,961,538 A | 10/1999 | Pedlick et al. | |
| 5,989,252 A | 11/1999 | Fumex | |
| 6,056,773 A | 5/2000 | Bonutti | |
| 6,066,160 A | 5/2000 | Colvin et al. | |
| 6,117,161 A | 9/2000 | Li et al. | |
| 6,270,518 B1 | 8/2001 | Pedlick et al. | |
| 6,293,961 B2 | 9/2001 | Schwartz et al. | |
| 6,451,030 B2 | 9/2002 | Li et al. | |
| 6,500,195 B2 | 12/2002 | Bonutti | |
| 6,511,498 B1 | 1/2003 | Fumex | |
| 6,520,980 B1 | 2/2003 | Foerster | |
| 6,527,795 B1 | 3/2003 | Lizardi | |
| 6,547,800 B2 | 4/2003 | Foerster et al. | |
| 6,592,609 B1 | 7/2003 | Bonutti | |
| 6,645,227 B2 | 11/2003 | Fallin et al. | |
| 6,660,023 B2 | 12/2003 | McDevitt et al. | |
| 6,726,707 B2 | 4/2004 | Pedlick et al. | |
| 6,773,436 B2 | 8/2004 | Donnelly et al. | |
| 6,843,799 B2 | 1/2005 | Bartlett | |
| 6,972,027 B2 | 12/2005 | Fallin et al. | |
| 6,986,781 B2 | 1/2006 | Smith | |
| 7,041,120 B2 | 5/2006 | Li et al. | |
| 7,081,126 B2 | 7/2006 | McDevitt et al. | |
| 7,232,455 B2 | 6/2007 | Pedlick et al. | |
| 7,320,701 B2 | 1/2008 | Haut et al. | |
| 7,556,640 B2 | 7/2009 | Foerster | |
| 7,566,339 B2 | 7/2009 | Fallin et al. | |
| 7,641,672 B2 | 1/2010 | Fallin et al. | |
| 7,645,293 B2 | 1/2010 | Martinek et al. | |
| 7,674,275 B2 | 3/2010 | Martin et al. | |
| 7,682,374 B2 | 3/2010 | Foerster et al. | |
| 7,722,644 B2 | 5/2010 | Fallin et al. | |
| 7,806,909 B2 | 10/2010 | Fallin et al. | |
| 7,857,830 B2 | 12/2010 | Stone et al. | |
| 7,875,064 B2 | 1/2011 | Donnelly et al. | |
| 7,905,903 B2 | 3/2011 | Stone et al. | |
| 7,909,851 B2 | 3/2011 | Stone et al. | |
| 7,959,650 B2 * | 6/2011 | Kaiser | A61B 17/06166 606/232 |
| 7,963,972 B2 | 6/2011 | Foerster et al. | |
| 8,052,719 B2 | 11/2011 | Paulos | |
| 8,088,130 B2 * | 1/2012 | Kaiser | A61B 17/06166 606/139 |
| 8,118,835 B2 | 2/2012 | Weisel et al. | |
| 8,298,262 B2 | 10/2012 | Stone et al. | |
| 8,348,975 B2 | 1/2013 | Dreyfuss | |
| 8,366,744 B2 | 2/2013 | Bojarski et al. | |
| 8,419,794 B2 | 4/2013 | ElAttrache et al. | |
| 8,425,536 B2 | 4/2013 | Foerster et al. | |
| 8,449,584 B2 | 5/2013 | Donnelly et al. | |
| 8,454,655 B2 | 6/2013 | Yeung et al. | |
| 8,512,375 B2 | 8/2013 | Torrie et al. | |
| 8,771,314 B2 | 7/2014 | Crombie et al. | |
| 8,777,992 B2 | 7/2014 | Yeung et al. | |
| 8,828,052 B2 | 9/2014 | Caborn et al. | |
| 8,828,053 B2 | 9/2014 | Sengun et al. | |
| 8,845,699 B2 | 9/2014 | Bonutti | |
| 8,932,331 B2 | 1/2015 | Kaiser et al. | |
| 8,951,287 B1 | 2/2015 | Green et al. | |
| 8,986,346 B2 | 3/2015 | Dreyfuss | |
| 9,072,509 B2 | 7/2015 | Stoll, Jr. et al. | |
| 9,173,645 B2 | 11/2015 | Overes et al. | |
| 9,173,651 B2 | 11/2015 | Stone et al. | |
| 9,192,369 B2 | 11/2015 | Bittenson | |
| 9,216,036 B2 | 12/2015 | Johnstone | |
| 9,220,493 B2 | 12/2015 | Hart et al. | |
| 9,265,495 B2 | 2/2016 | Petersen et al. | |
| 9,271,714 B2 | 3/2016 | Martin | |
| 9,301,756 B2 | 4/2016 | Wardle | |
| 9,307,979 B1 | 4/2016 | Bennett et al. | |
| 9,314,238 B2 | 4/2016 | Martin | |
| 9,320,512 B2 | 4/2016 | Dooney, Jr. | |
| 9,345,467 B2 | 5/2016 | Lunn et al. | |
| 9,402,621 B2 | 8/2016 | Stone et al. | |
| 9,421,008 B2 | 8/2016 | Burkhart et al. | |
| 9,451,945 B2 | 9/2016 | Hawkins | |
| 9,463,008 B2 | 10/2016 | Thal | |
| 9,492,158 B2 | 11/2016 | Stone et al. | |
| 9,504,462 B2 | 11/2016 | Dooney, Jr. et al. | |
| 9,526,489 B2 | 12/2016 | Burkhart | |
| 9,532,777 B2 | 1/2017 | Kaiser et al. | |
| 9,539,000 B2 | 1/2017 | Hendricksen et al. | |
| 9,545,251 B2 | 1/2017 | Bojarski et al. | |
| 9,597,070 B2 | 3/2017 | Bittenson | |
| 9,603,591 B2 | 3/2017 | Denham et al. | |
| 9,622,738 B2 | 4/2017 | Dreyfuss et al. | |
| 9,655,611 B2 | 5/2017 | Green et al. | |
| 9,693,765 B2 | 7/2017 | Sullivan et al. | |
| 9,713,463 B2 | 7/2017 | Oren et al. | |
| 9,713,464 B2 | 7/2017 | Overes et al. | |
| 9,717,491 B2 | 8/2017 | Hoeppner | |
| 9,724,090 B2 | 8/2017 | Kaiser et al. | |
| 9,763,655 B2 | 9/2017 | Sengun | |
| 9,763,656 B2 | 9/2017 | Stone et al. | |
| 9,763,719 B2 | 9/2017 | Snyder et al. | |
| 9,814,565 B2 | 11/2017 | Foerster et al. | |
| 9,820,731 B2 | 11/2017 | Arai et al. | |
| 9,872,678 B2 | 1/2018 | Spenciner et al. | |
| 9,931,150 B2 | 4/2018 | Philippon et al. | |
| 9,962,149 B2 | 5/2018 | Brown et al. | |
| 9,974,534 B2 | 5/2018 | Troxel et al. | |
| 10,004,495 B2 | 6/2018 | Dimatteo et al. | |
| 10,130,354 B2 | 11/2018 | Dooney, Jr. | |
| 10,130,355 B2 | 11/2018 | Denham et al. | |
| 10,154,837 B2 | 12/2018 | Stone et al. | |
| 10,172,607 B2 | 1/2019 | Burkhart | |
| 10,178,989 B2 | 1/2019 | Bennett et al. | |
| 10,182,806 B2 | 1/2019 | Foerster | |
| 10,265,159 B2 | 4/2019 | Denham et al. | |
| 10,285,684 B2 | 5/2019 | Spenciner et al. | |
| 10,292,694 B2 | 5/2019 | Graul et al. | |
| 10,292,697 B2 | 5/2019 | Karasic et al. | |
| 10,321,906 B2 | 6/2019 | Stone et al. | |
| 10,368,856 B2 | 8/2019 | Stone et al. | |
| 10,376,260 B2 | 8/2019 | Bojarski et al. | |
| 10,398,428 B2 | 9/2019 | Denham et al. | |
| 10,441,408 B2 | 10/2019 | Dreyfuss et al. | |
| 10,448,942 B2 | 10/2019 | Santangelo et al. | |
| 10,478,172 B1 | 11/2019 | Williams et al. | |
| 10,524,776 B2 | 1/2020 | Dreyfuss | |
| 10,543,075 B2 | 1/2020 | Gregoire et al. | |
| 10,575,842 B2 | 3/2020 | Lund | |

(56) References Cited

U.S. PATENT DOCUMENTS

| | | |
|---|---|---|
| 10,588,614 B2 | 3/2020 | Gittings et al. |
| 10,588,617 B2 | 3/2020 | Astorino et al. |
| 10,595,850 B2 | 3/2020 | Anderson |
| 10,603,029 B2 | 3/2020 | Kaiser et al. |
| 10,617,408 B2 | 4/2020 | Karasic et al. |
| 10,631,844 B2 | 4/2020 | Astorino et al. |
| 10,667,803 B2 | 6/2020 | Lizardi |
| 10,675,015 B2 | 6/2020 | Guo et al. |
| 10,702,259 B2 | 7/2020 | Stone et al. |
| 10,729,421 B2 | 8/2020 | Stone et al. |
| 10,736,620 B2 | 8/2020 | Dreyfuss et al. |
| 10,743,856 B2 | 8/2020 | Durando |
| 10,772,622 B2 | 9/2020 | Santangelo et al. |
| 10,786,235 B2 | 9/2020 | Sorensen et al. |
| 10,849,734 B2 | 12/2020 | Holowecky et al. |
| 10,863,979 B2 | 12/2020 | Sorensen et al. |
| 10,905,409 B2 | 2/2021 | Brown et al. |
| 10,912,551 B2 | 2/2021 | Troxel et al. |
| 10,952,719 B2 | 3/2021 | Lombardo et al. |
| 10,966,703 B2 | 4/2021 | Nason et al. |
| 10,966,704 B2 | 4/2021 | Lozier et al. |
| 10,966,705 B2 | 4/2021 | Rodriguez et al. |
| 10,987,099 B2 | 4/2021 | Stone et al. |
| 2006/0178702 A1 | 8/2006 | Pierce et al. |
| 2009/0306711 A1* | 12/2009 | Stone ............... A61B 17/0487 606/232 |
| 2009/0312782 A1 | 12/2009 | Park |
| 2013/0123810 A1 | 5/2013 | Brown et al. |
| 2013/0190815 A1 | 7/2013 | Mansmann |
| 2015/0164497 A1* | 6/2015 | Callison ............ A61B 17/0485 606/232 |
| 2015/0250470 A1 | 9/2015 | Vargas |
| 2017/0095363 A1* | 4/2017 | Hiernaux .......... A61B 17/0401 |
| 2018/0028171 A1 | 2/2018 | Sugimoto et al. |
| 2018/0221017 A1 | 8/2018 | Stone et al. |
| 2018/0271522 A1* | 9/2018 | Medoff ............. A61B 17/0401 |
| 2018/0353167 A1 | 12/2018 | Lombardo et al. |
| 2019/0015092 A1 | 1/2019 | Bosworth |
| 2019/0059872 A1 | 2/2019 | Otrando et al. |
| 2019/0070007 A1 | 3/2019 | Bettenga et al. |
| 2019/0247039 A1* | 8/2019 | Gregoire ................ A61F 2/0811 |
| 2020/0178951 A1 | 6/2020 | Johnson et al. |
| 2020/0253715 A1 | 8/2020 | Trenhaile |
| 2020/0315775 A1 | 10/2020 | Pilgeram et al. |
| 2021/0244402 A1 | 8/2021 | Leffler |
| 2021/0338239 A1 | 11/2021 | Zipory et al. |

\* cited by examiner

TENSIONABLE AND LOCKABLE SOFT SUTURE ANCHORS AND ANCHOR ARRAYS FOR ANATOMICAL ATTACHMENT OF SOFT TISSUE TO BONE

CROSS REFERENCE TO RELATED APPLICATIONS

The present application claims the benefit of and priority to U.S. Prov. Pat. App. No. 63/231,143, filed Aug. 9, 2021, titled TENSIONABLE AND LOCKABLE SOFT SUTURE ANCHORS AND ANCHOR ARRAYS FOR ANATOMICAL ATTACHMENT OF SOFT TISSUE TO BONE, U.S. Prov. Pat. App. No. 63/172,565, filed Apr. 8, 2021, titled TENSIONABLE AND LOCKABLE MICRO SUTURE ANCHORS AND ANCHOR ARRAYS FOR ANATOMICAL ATTACHMENT OF SOFT TISSUE TO BONE, and U.S. Prov. Pat. App. No. 63/281,411, filed Nov. 19, 2021, titled DELIVERY DEVICE FOR IMPLANTING KNOTLESS MICRO-SUTURE ANCHORS AND ANCHOR ARRAYS FOR ATTACHMENT OF SOFT TISSUE TO BONE, the disclosures of which are incorporated herein by reference.

BACKGROUND

Throughout the human body there are many attachments of soft tissue, such as tendons and ligaments, to bone as integral elements of motion in functioning joints such as the shoulder. The shoulder joint includes the humeral head of the upper arm bone in contact with the indentation of the glenoid working in conjunction with the rotator cuff, which is a combination of muscles and tendons forming a capsule that both stabilizes the joint and causes desired motion. Injury to the connection between tendons of the rotator cuff muscles to the humeral head, usually a tear in a tendon, is common. These tears do not self-heal. It is estimated that in the U.S. over 4 million people annually are referred to a surgeon due to shoulder pain and over 500,000 of these referrals result in shoulder surgery to repair the rotator cuff.

Significant effort has been expended over the past 30 years to develop bone and tissue anchor devices and methods to respond to the need for effective rotator cuff repair. Early methods and devices utilized an open surgical technique that required a large incision of 4 to 6 cm and cutting the deltoid muscle, then re-attaching after the rotator cuff repair. This method is still used today for massive tears by some surgeons due to high success rate, however, the procedure is associated with deltoid dysfunction, significant pain during recovery and extensive rehabilitation time. Due to the invasiveness of the open surgery and resulting rehabilitation time, a "mini-open" procedure and associated devices were developed in the early 1990's, wherein the surgeon uses a partial arthroscopic technique followed by an incision and split of the deltoid muscle fibers to access the rotator cuff tendon for repair. By the late 1990's, devices and instruments were further developed to complete the repair of rotator cuff tendon attachment to bone using all-arthroscopic techniques, with further resultant reduction in trauma and recovery time.

Arthroscopic repair of the rotator cuff tendon attachments to the humeral head are the most common technique used today. However, it is recognized that these all-arthroscopic techniques are quite difficult to perform and achieve varying results. The skill of the surgeon with the technology available is a known factor related to the procedure's success. Even with the last 20 years of all-arthroscopic technologic advancement and experience, deficiencies persist as evidenced by studies indicating an overall average rotator cuff repair failure rate of 20% to 40%, with a highly variable range of 4% to 90% in individual studies. The study results indicate failure rates are much higher for large or massive tendon tears and there are vast variations in failure rates between surgeons, as well as with respect to various patient factors, equipment used, and type of repair completed.

There is significant controversy among professionals as to the reasons for the high incidence of arthroscopic rotator cuff repair failure (i.e., "re-tear of the rotator cuff"). However, studies clearly show there is a need to reduce the failure rate of arthroscopic rotator cuff repair to avoid its effects of patients' lack of mobility, functional deficits, increased pain and/or requiring subsequent and more invasive surgery with the attendant pain and rehabilitation. In particular, there is great concern for patients who have some degree of native tendon or repair tendon failure yet choose to "live with it" rather than going through a first or another surgery and rehabilitation, thus affecting quality of life and promoting continued joint degradation from lack of use.

The basic device or devices used for repair of a tendon torn from a bone is one or more suture anchors in which a mechanical structure provides an anchor to the bone and a suture or sutures extend therefrom for attachment to the soft tissue or tendon. Many types of anchor technologies have been proposed and used in procedures. A review of the prior art patent literature indicates over a thousand designs for suture anchors, bone anchors, tendon repair systems, delivery devices and methods espousing improved features over the past 25 years, yet repair failure rate is still unacceptable indicating the need for further improvement in the area of arthroscopic reattachment of tendons to bone and in particular in rotator cuff repair.

OVERVIEW

The present inventors have recognized, among other things, that a problem to be solved is the need for new and/or alternative devices and methods for arthroscopically affixing a tendon or other soft tissue to bone such as in rotator cuff repair with low failure rate, preferably under 10% on average, with little variation between surgeons, patient characteristics, and the system/method used for repair. The disclosed devices, systems, and methods, along with a statement of the problem being solved by each element are included in summary form followed by a description of specific claimed structure or methods in the present disclosure.

The present disclosure includes a total system for reattaching a tendon that has at least in part torn away from a bone attachment or footprint. The system is useful in repair of a rotator cuff tendon that has torn away from a bone, but may also be used in other soft tissue, tendon and/or ligament related procedures. The system is particularly useful in repair of the rotator cuff by reattaching a torn tendon, such as the most-commonly-torn supraspinatus tendon, to the humeral head of the arm. In larger tears, the infraspinatus tendon may also be torn and amenable to repair with this system. The repair is an anatomical repair, meaning that the system, devices and methods result in a repaired tendon and bone combination that closely approximates the prior natural, anatomic relationship between that tendon and bone to promote healing and provide pain-free full function to the healed repair. An anatomical repair using the presently described system may also seal the tendon in position, taking advantage of local synovial fluid to aid healing and improve post-surgery function. The system may also be used to reinforce partial tears and to secure areas beyond the region of a full-thickness tear as needed. Further, the system, as implanted can dramatically reduce recovery and rehabilitation time due to the robust nature of the repair immediately following surgery, requiring less time using a sling to limit mobility and allowing early physical therapy to maintain pre-surgery mobility and strength during healing. It is believed time in a sling and complete recovery time can be reduced at least 50%, while reducing the average failure rate to less than 10% with the current disclosed system.

As stated, in preferred examples, the exemplary rotator cuff repair is an anatomical repair in that the repaired tendon nearly duplicates or closely approximates the natural tendon and bone relationship in the fully functional joint. In illustrative examples, the tendon/tendons is/are substantially and completely re-attached to the original footprint on the bone from which it was torn. The original footprint area provides the greatest likelihood of healing re-attachment of the tendon to the bone while restoring anatomy. By substantially re-attached to the original footprint it is meant that a substantial portion of the remaining torn tendon surface that was originally attached to the footprint is re-attached thereto. The current system makes possible close approximation of the original tendon attachment by allowing transtendinous or through the tendon implantation of each anchor. Thus, the tendon is held in the desired location when the anchor is installed, unlike current systems that insert anchors into exposed bone through a tear and then use suture passers (which pass the suture when the tendon is not in position) to approximate where the surgeon believes the tendon will pull down to the footprint. Further, the anatomical repair reduces micromotion at the bone to tendon interface so that healing is promoted, even during movement of the joint. Finally, access to blood for healing is improved due to utilizing substantially more small holes in the proximal humerus to accommodate a large number of anchors in a close array.

In fresh cadaveric studies, using the presently disclosed system, the repaired tendon and bone combination provide a tensile strength upon re-attachment of greater than 400 Newtons (N) and initial cyclic creep or gap formation of less than 2 millimeters (mm) when cycled to a peak load on the repaired tendon per cycle of 180 N. Initial cyclic creep measures the rigidity or robustness of the attachment of the tendon to the bone as it measures how much the tendon slides or moves relative to the bone attachment. Low initial cyclic creep allows the potential for faster healing and less need for sling immobilization. Creep of less than 2 mm. or even less than 1 mm is therefore a preferred outcome in some examples. In other words, if the tendon stays fixed in position relative to the bone it is compressed against (i.e., reduced micromotion), the healing process will occur more quickly predictably than a situation that includes sliding of the tendon back and forth relative to the bone.

In preferred examples, the anatomic repair requires a high-density array of knotless small anchors (requiring a bone hole size for insertion of less than 3 mm) with close spacing between anchors (less than 7 mm edge to edge, or less than 10 mmm hole center to hole center) to create anchor to subsequent anchor suture stitches that apply many points of constant independent force on the tendon against the bone. By independent it is meant that failure of one suture stitch to apply adequate force, as would happen if the suture stitch broke, does not affect other suture stitches. Naturally, the number of anchors utilized in a repair will depend upon the size of the tear.

It is recognized in the art that rotator cuff tears are classified into four categories based on tear size and whether a single row or double row repair is completed. Small tears are less than 1 centimeter (cm) in length; medium tears are 1 cm to 3 cm in length; large tears are 3 cm to 5 cm in length and massive tears are greater than 5 cm in length. With current devices, surgeons are limited to available large anchors and by the size of the tear as the medial anchors must fit in the tear area. For example, surgeons may use about 1 medial anchor on small tears, 1 or 2 medial anchors on medium tears and 2 or 3 medial anchors on large tears and massive tears. With the high anchor density anatomical repair of the present application, the surgeon is not limited by tear size as the anchors are implanted through the tendon and can use greater than 3 medial anchors on small tears, greater than 5 medial anchors on medium tears, and greater than 6 medial anchors on large tears and massive tears. This can include positioning implants outside the area of a full thickness tear to reinforce areas of partial thickness tears or weaker untorn tendon. Further, the present suture anchors are designed for knotless tensioning and locking to expedite implantation, maximize reproducibility amongst surgeons, and not interfere with shoulder mobility from protruding knots while eliminating the tension variations that have been found in knotted suture anchors due to the difficulty of tying knots arthroscopically.

The suture anchors of several illustrative examples of the present disclosure are all-suture or soft anchors. The entire anchor may be made from soft or flexible material as opposed to hard plastics or metal anchoring members that are known in the art. In some examples, one or more hard plastic or metal features may be included, but in other embodiments the invention may be characterized by the omission of any hard plastic or metal feature or component. Several illustrative embodiments may include at least three components. First, there is a length of working suture. Second, there is an implant member through which the working suture is threaded or otherwise passed in slidable or flossable relationship. The implant member is transformable from a first linear configuration to a radially expanded configuration by pulling on one or both of the tails of the working suture extending from the implant member. This is done after the implant member is placed in a formed bone hole such that the anchor member is locked or retained in the bone hole due to its radially expanded shape. As expanded and retained in the bone hole, the working suture remains slidable or flossable as routed through the anchor member, although it is recognized that the amount of friction is greater than in the unexpanded first linear configuration. Third, the suture anchor embodiments include a locking loop or locking suture independent of the working suture. The locking suture is routed in any one of many alternative paths through and around portions of the anchor member and working suture as described below. In its open position the locking suture allows flossing movement of the working suture therethrough (and in relation to the anchor member) but in the closed position the locking loop engages the working suture in relation to the anchor member to lock the working suture relative to the anchor member.

The anchor may be a through the tendon or transtendinous implant as described with respect to the delivery device and method below. Being transtendinous eliminates the requirement of placing the anchors only where the tendon is absent from the bone such as in the hole formed by the tear or outside the tendon footprint. Furthermore, and importantly, the need for suture passing through the tendon is eliminated. Transtendinous implantation with many anchors used today entails technical challenges, including working a 3 mm to 6 mm in diameter anchor through a hole in the tendon with an awl, damaging the tendon when passed through. Further, threaded and flanged type anchor retention features may also damage the tendon during passing.

The anchor member can be made from a wide variety of soft materials and configured in many alternative formations relative to the working suture. In each, the working suture flosses or is slidable relative to the anchor member. Further, the anchor member is configured to be transformable from a linear configuration in which the anchor member can pass into a small bone hole to a radially expanded configuration that causes the anchor member to be retained in that same bone hole. The anchor member is expanded by pulling on one or both tails of the working suture extending out of the bone hole. The anchor member can be constructed of suture combined with braided material created from suture material for example. Strips of flexible material can also be utilized with the working suture woven therethrough. The working suture can also pass through a lumen formed in the anchor body as made or pass back and forth through the cross section of the anchor member.

In some embodiments, the tightening of the suture lock pulls a small portion of the working suture into a closer relationship or contact with the anchor member. The working suture is pinched in a tortuous path that provides a sound lock and prevents sliding of the working suture relative to the anchor member once the working suture and suture lock are appropriately tensioned. The strength of the lock is enhanced by the overall tortuous path followed by the working suture when the anchor is pulled against the cortical shell as the working suture can go through several near 90-degree turns which provide increased friction against the anchor member as well as the friction applied by the suture lock.

In some embodiments, the single working suture is pre-strung through a plurality of anchors to be used as a set to form an implanted array having a tensioned suture stitch extending from one anchor to the subsequent anchor in the pre-strung chain. As previously stated, in some examples, each anchor is slidable or flossable with sufficient force applied to move along the working suture. Each anchor is equipped with a suture lock as described above, except the first anchor in the chain which can have a standard suture lock or a fixed non-slidable suture connection. A chain of anchors can carry in the range of about 8 to 12 anchors in some preferred embodiments. In some examples, a chain of anchors may include one or more anchors that are adapted to be slidable or flossable relative to the working suture, with one or more anchors (such as anchors at one end or the other of the chain) which are pre-fixed in position along the working suture. In other examples, every anchor of a chain of anchors is adapted to be slidable or flossable relative to the working suture.

The high-density array of anchors is formed by implantation of the anchors in a chain or row which can be a relatively straight line or curve depending upon the tear to be repaired at the discretion of the surgeon. A delivery device designed for sequential transtendinous implantation of each anchor in the array includes an elongated tube with a lumen therethrough having an anchor delivery tube therein with a short nub and a bone punch extending from a distal end of the elongate tube and anchor delivery tube. The bone punch extends beyond the short nub in an extended position. In use, the distal end of the three-part assembly (bone punch, nub and elongate tube) which leads with the distal tip of the punch, is positioned at a selected location on top of the tendon as properly positioned on the bone beneath. The assembly is tapped so that the punch penetrates the tendon and the bone while the nub follows and extends into the bone hole at least a short distance. The assembly is inserted until the distal end of the elongate tube is in desired contact with the tendon surface. At this point the punch is withdrawn proximally while the nub maintains registration with the formed hole and the elongate tube is pressed against the tendon surface. A first anchor is loaded into the elongate tube proximal portion and a push rod is moved distally to force the first anchor/implant down the tube through the tendon along the nub and into the bone. The nub functions like a shoehorn to track the anchor through the spongy tissue of the tendon that has closed around the nub.

Once the first anchor is inserted to the full depth of the push rod, the push rod is removed. This action can also release the nub so that it can move proximally into the tube if needed as the implanted anchor is moved up against the inner cortical shell. In some examples, the nub is not merely released, but is actively retracted by use of a linkage associated with an actuator in the anchor delivery tool handle that is configured to apply a positive force to the nub to retract it once the anchor is inserted, so that the nub can be retracted to prevent the nub damaging the working suture or suture lock (or anchor itself) during further steps. With the push rod, and possibly the nub, retracted, the distal portion of the working suture is pulled to move the anchor member toward the cortical shell. The working suture may be locked into position using the locking suture prior to pulling the distal portion of the working suture, or even prior to starting implant of the first anchor, if desired. As the first anchor is secured, the anchor delivery tool distal end may be held against the tendon to provide a counterforce that prevents backout of the anchor and/or reduces a likelihood of fracture of the cortical shell.

When the first anchor is set in sufficiently strong material inside the bone (which can be harder cancellous bone or may be resting against the under surface of the cortical shell) the delivery device can be moved for implantation of the next anchor. With the second and subsequent anchors, both a proximal and a distal suture portions of the working suture extend up through the delivery device. It is the distal portion of the working suture that is pulled to cause the anchor member to expand while also allowing the working suture to slide through the anchor member and the slack extending to the distal hole of the previous anchor is therefore shortened. Again, during tensioning of the stitch, as well as steps to lock the anchor in place, the anchor delivery tool distal end may be pressed against the tendon as a counterforce against back-out and/or fracture. This is continued until the properly tensioned suture stitch or stitch is formed at which point the suture lock on the second or subsequent anchor is activated to maintain tension in the individual suture stitch. The locking suture proximal extension can be cut off after tightening or a selectively breakable suture can be used and such breakable portion is positioned proximate the slidable knot.

This is repeated for a desired number of anchors in the pre-strung chain which as implanted form a high-density array as described above. As can be understood, the number of suture stitches formed is equal to the number of anchors in the chain implanted minus 1. Further, the string of stitches is continuous with each stitch tensioned and locked independently to form a required robust tendon attachment. The continuous string of stitches can form a row or chain of stitches of desired shape such as a linear row, a zig-zag shape, an arc, etc. By row or chain, it is meant that the suture stitches extend from one anchor to the next in the sequence of implanted anchors.

As previously stated, the distance between ends of a suture stitch (the distance between anchors) may be, preferably, less than about 10 mm to provide consistent force on the tendon against the bone to reduce creep (if measuring from hole edge to hole edge, the distance may be less than about 7 mm). One particularly robust array of implanted anchors includes a first array implanted in a medial portion of the original tendon footprint to form a row or line of stitches generally perpendicular to the length or direction of the tendon's forces. A second array can then be implanted laterally nearer the edge of the tear with at least one anchor through the tendon while at least one other anchor is implanted laterally of the tendon edge to reapproximate the tendon properly against the bone. The lateral row can be implanted in a zig zag pattern or other appropriate pattern based on the shape of the tear. Depending upon tear size and location, multiple patterns can be utilized.

In one particular embodiment, the present disclosure is directed to a soft suture anchor that can be tensioned within a bone hole and the working suture locked relative to the anchor member upon tensioning. It can include a length of suture forming a U-shaped anchor with two tails extending therefrom and a soft anchor body having the suture slidably disposed therethrough which is implantable in a bone hole. Upon tensioning one or both suture tails while implanted, the soft anchor body expands within the bone hole while the suture remains slidably disposed in the expanded anchor body. A locking loop can be included which encircles a portion of the soft anchor body and/or the working suture and can be affixed thereto. The locking loop has a first position allowing the suture to slide through the locking loop and a second position engaging the expanded soft anchor body and/or working suture to frictionally prevent sliding of the suture within the locking loop and soft anchor body combination.

The soft anchor body can be a sleeve of hollow suture through which the length of suture is slidably disposed. The tails of the working suture can exit the sidewalls of the sleeve. The anchor member can also be a length of braided strands into which the suture is woven. Alternatively, the anchor member can be a second length of suture with the first suture passing through the sidewall of the second length of suture at least four times to form accordion like folds.

In yet another embodiment, the soft suture anchor member can be a collapsible elongate cylinder having the suture tails woven in and out of the cylinder side walls. Alternatively, the soft suture anchor member can be a collapsible ring with the suture tails woven in and out of the ring.

In one preferred the configuration, a plurality of anchor members form a system of soft suture anchors connected serially. The system can include a single working suture with a plurality of U-shaped anchors formed thereon by a plurality of soft anchor bodies slidably disposed on the single working suture with a length of the working suture extending from each end of the soft anchor bodies to form two tails extending from each anchor. Each soft anchor body is implantable in a formed bone hole, wherein upon tensioning one or both suture tails while implanted, the soft anchor member expands within the bone hole while the suture remains slidably disposed in the expanded anchor member. A locking loop is included on each anchor body which encircles a portion of the soft anchor body and/or working suture and is affixed thereto. The locking loop having a first position allowing the suture to slide through the locking loop and a second position engaging the expanded soft anchor member and/or working suture to frictionally prevent sliding of the suture within the locking loop and soft anchor body combination.

The present disclosure also includes alternative methods for creating a serial array of tensioned and independently locked anchor to anchor suture stiches to attach soft tissue to bone. A pre-strung plurality of soft anchors, each soft anchor serially disposed on a single working suture with a plurality of U-shaped anchors formed thereon by a plurality of soft anchor bodies slidably disposed on the single working suture with a length of the working suture extending from each end of the soft anchor bodies to form two tails extending from each anchor. Each soft anchor body is implantable in a formed bone hole, wherein upon tensioning one or both suture tails while implanted, the soft anchor body expands within the bone hole while the suture remains slidably disposed in the expanded anchor body. A locking loop is disposed proximate each anchor body which encircles a portion of the soft anchor body and/or the working suture and is affixed thereto. The locking loop has a first position allowing the suture to slide through the locking loop and a second position engaging the expanded soft anchor body to frictionally prevent sliding of the suture within the locking loop and soft anchor body combination.

A first anchor of the pre-strung plurality of anchors is implanted in bone and the suture is locked. A second anchor in the pre-strung plurality of anchors in bone spaced a selected distance from the first anchor is implant, then tension is applied to the suture extending from the first anchor and passing through the second anchor. Upon tensioning, the locking suture is locked in the second anchor after tensioning to create a single suture tensioned and locked stitch between the first and second anchor.

A third anchor in the pre-strung plurality of anchors is next implanted in bone spaced a selected distance from the second anchor, then tension is applied to the suture extending from the second anchor and passing through the third anchor, followed by locking the suture in the third anchor after tensioning to create a single suture tensioned and locked stitch between the second and third anchor. For each subsequent anchor in the serial array, the steps of implanting, tensioning and locking are repeated to create additional serial single suture tensioned and locked stitches.

This overview is intended to introduce the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
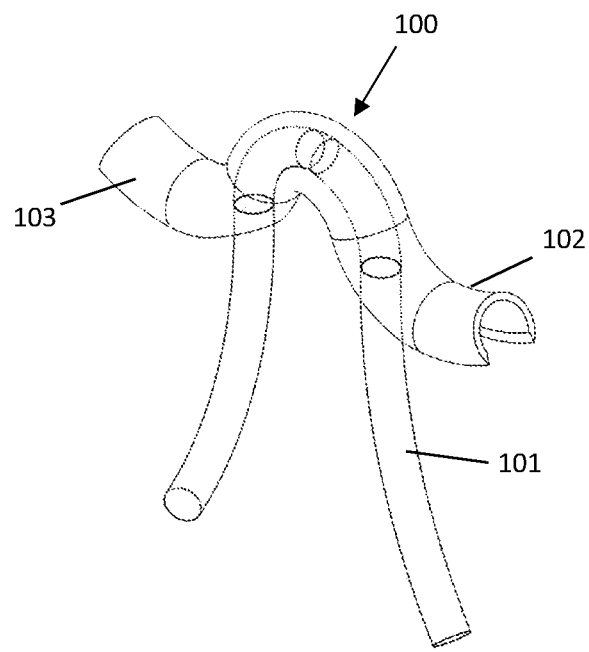
FIG. 1A is a perspective view of a representative all-suture or soft anchor.

The present invention includes multiple components, devices and methods to create and use an overall system for reattaching soft tissue to bone. It is particularly useful to create a robust repair of avulsed or torn tendons, such as the supraspinatus tendon, in an arthroscopic rotator cuff repair. The implants and delivery devices make possible a more efficient and reproducible anatomical repair which should have more success (i.e., lower failure rate) than current techniques. The tendon is securely attached and held with adequate force to its original footprint with very little creep during movement of the joint. This may decrease the need for a patient's shoulder to be immobilized in a sling, increase the rate of healing reattachment of tendon to bone, and allow early physical therapy to idealize postoperative shoulder range of motion and strength.

The implanted array of anchors with a continuous set of anchor-to-anchor single suture stitches creates a seam-like attachment akin to a sewing machine construct. Further, the small cross-sectional size of the anchors (less than 3 mm in diameter) allows the anchors to be placed in close proximity to one another (less than about 7 mm between adjacent anchors, or less than 10 mm from center of bone hole to center of bone hole). This creates a very stable anchor-to-anchor suture stitch. Combining this concept with the disclosed anchor design allows the suture stitch to be tightened and locked individually when the adjacent suture anchors are implanted. This can be repeated many times to implant a row of anchors with continuous independently tensioned and locked sutures between adjacent anchors. Also, because the anchors are in a high-density array, the tension force components on the tensioned suture are more vertically applied to the top surface of the tendon (or other connective tissue) to thereby compress the tendon firmly against the footprint of the bone without creep or slippage during joint movement which idealizes the tendon healing environment.

In some examples, the anchors of the present disclosure are all-suture or soft anchors. Three components, in various forms and embodiments, are common to exemplary embodiments. First, each includes a soft anchor member. The anchor member can be in many forms however each are fabricated to have a first linear shape for insertion into a bone hole that can then be expanded radially, such as into a second shape, to affix the anchor member within the bone hole. Second, each anchor embodiment includes a working suture that is routed on a path through the anchor member such that the working suture is slidable or flossable through the anchor. In other words, pulling on one leg of the working suture will cause the working suture to slip through anchor member. This includes both when the anchor member is in the initial linear shape and after the anchor member has been implanted and expanded to affix within the bone hole. Third, each anchor embodiment includes a locking loop or locking suture that encircles at least a portion of the working suture and/or the anchor member. The locking loop can be affixed to the working suture, the anchor member, and/or both the working suture and the anchor member in some embodiments. The locking loop is movable from a first position in which the loop is open and allows the working suture to slide or floss relative to the anchor member. By pulling on the free tail of the locking loop, the locking loop can be altered to a second configuration in which the locking loop is tightened around a portion of the working suture and/or the anchor member to secure the working suture in a locked position relative to the anchor member as implanted.

FIGS. 1A-1F are a series of illustrations of an exemplary all-suture anchor that incorporates several alternative locking sutures or locking loop configurations relative to the working suture and anchor member. The illustrations also show a single working suture slidably disposed in passages through the anchor member and through a locking loop. The locking loop is configured to have an open position allowing movement of the single working suture, and a closed or locked position that prevents movement of the single working suture relative to the anchor member and/or the locking loop.

Referring to FIG. 1A, a simplified perspective view of a representative soft anchor 100 is illustrated. The anchor 100 includes two components, namely a working suture 101 that is slidably disposed within the lumen of an anchor member 102. The anchor member 102 as illustrated can be a length of hollow woven suture material. As depicted the ends 103 of the anchor member 102 flare outward away from the working suture. The anchor member 102 is a soft or flexible member that can easily fold into a linear configuration for insertion in a small bone hole, for example as shown in FIG.

3, below. After insertion, the tails of the working suture 101 can be tensioned which causes the anchor member to migrate toward the bone hole opening. However, the designed arms 103 extending laterally when relaxed will catch on the bone hole and cause the anchor member 102 to expand radially and be locked within the bone hole.

In some examples, the ends 103 of the anchor member 102 are open on one side, as depicted in the figures, while a central portion of the anchor member 102 forms a complete cylinder and is not open on any side thereof, thereby maintaining the anchor member 102 on the working suture 101 while allowing the ends 103 to flare outward as shown. In some examples, the entire anchor member 102 is a soft and/or flexible material. In other examples the ends 103 may have an additional coating or different structure that adds rigidity to the ends and/or central portion of the anchor member 102. In still another example, the anchor member can be generally stiffer throughout, at least relative to the working suture 101, to provide additional anchoring strength. For example, the anchor member 102 may be formed of a different type of suture or with a different thickness of suture than the working suture 101. The anchor member 102 may be, for example, a coated, braided synthetic material having greater stiffness and larger outer diameter, and the working suture may be a relatively thinner, braided (for knot security) natural material of relatively lesser outer diameter. Other combinations may be used, as desired. In an example, the anchor member 102 may be formed of a hollow braid, cut to length, slit to form the ends 103, and then coated to prevent fraying along the ends, if desired.

Figure 1B:
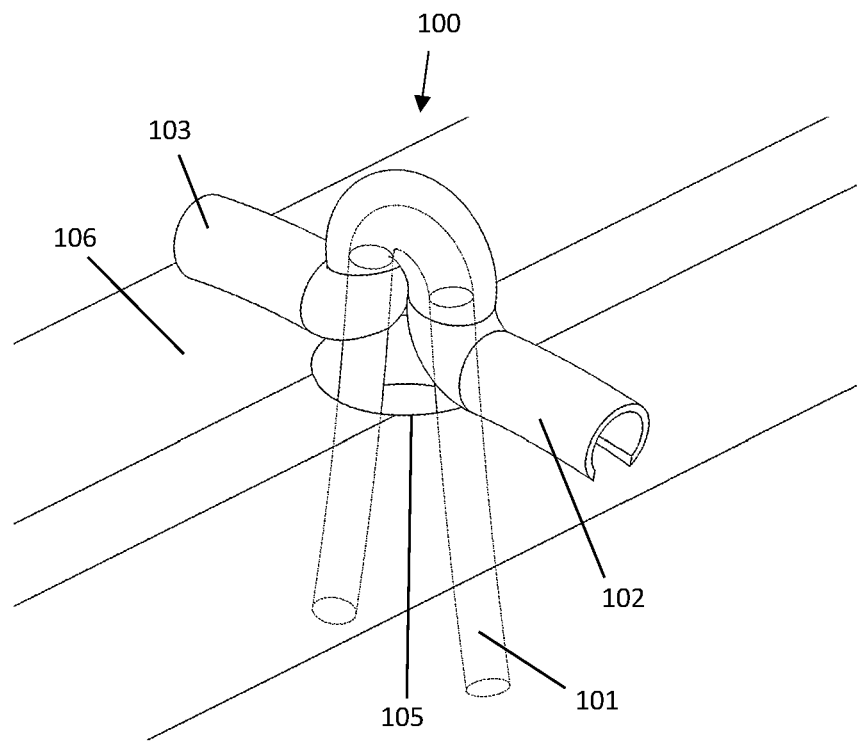
FIG. 1B is a perspective view of the anchor of FIG. 1A with the anchor member expanded.

FIG. 1B shows the anchor of FIG. 1A as implanted and expanded within a bone hole 105 formed in the bone 106 of a joint, such as the humeral head of the shoulder. Tails of the working suture 102 extend from the bone hole for attachment to tendon. At the same time, the projections or flanges 103 of the anchor member 102 are trapped and locked within the bone. In this locked configuration, the working suture 101 is still slidable or flossable relative to the anchor member. A slidable working suture 101 may allow tensioning of individual suture stitches that extend from one anchor to the next anchor in the serial row of the array.

Figure 1C:
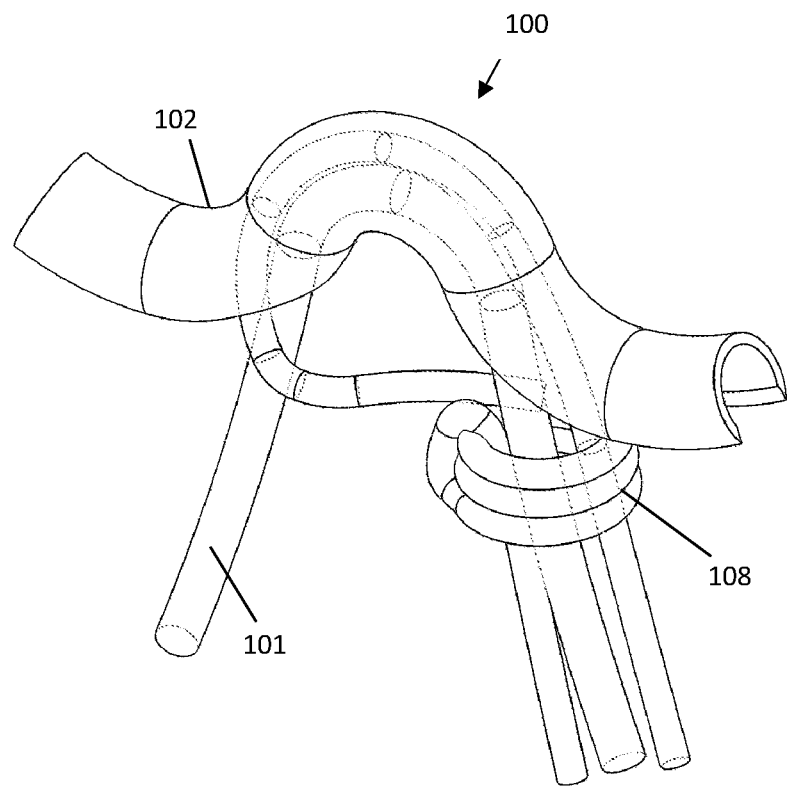
FIG. 1C is another perspective view of the anchor of FIG. 1A with one exemplary locking loop included.

Now referring to FIG. 1C, a third element, a locking loop 108, is added to the anchor 100 depicted in FIGS. 1A and 1B. The locking loop 108 allows the surgeon to actively lock the working suture 101 relative to the anchor member 102 after the anchor is locked in the bone hole and the working suture is tensioned to form a suture stitch with a prior implanted anchor. The individual locking at each anchor allows creation of multiple suture stitches that are independently tensioned and locked relative to other suture stitches. With this feature, breakage, slippage or other failure of one particular suture stitch will not affect other stitches. In other words, failure of one suture stitch does not result in failure of the overall repair structure, when the locking loop 108 is used. While the locking loop 108 is not shown in FIGS. 1A-1B, it should be understood that the locking loop 108 would be pre-loaded and packaged with the rest of the structure; drawings omitting the locking loop 108 are merely provided to aid in understanding the anchor itself.

The relationship between the locking loop 108 and the combination of the anchor member 102 and working suture 101 can be varied in embodiments within the scope of this application. FIGS. 1C-1F depict some representative alternatives. In FIG. 1C, the locking loop 108 includes a loop that extends through at least a portion of the anchor member. After affixing the implant member within the bone hole and tension of the working suture, the free end of the locking loop can be tensioned to close the loop. This causes the anchor member to collapse radially and form a tortuous path for the working suture, effectively locking it in position.

Figure 1D:
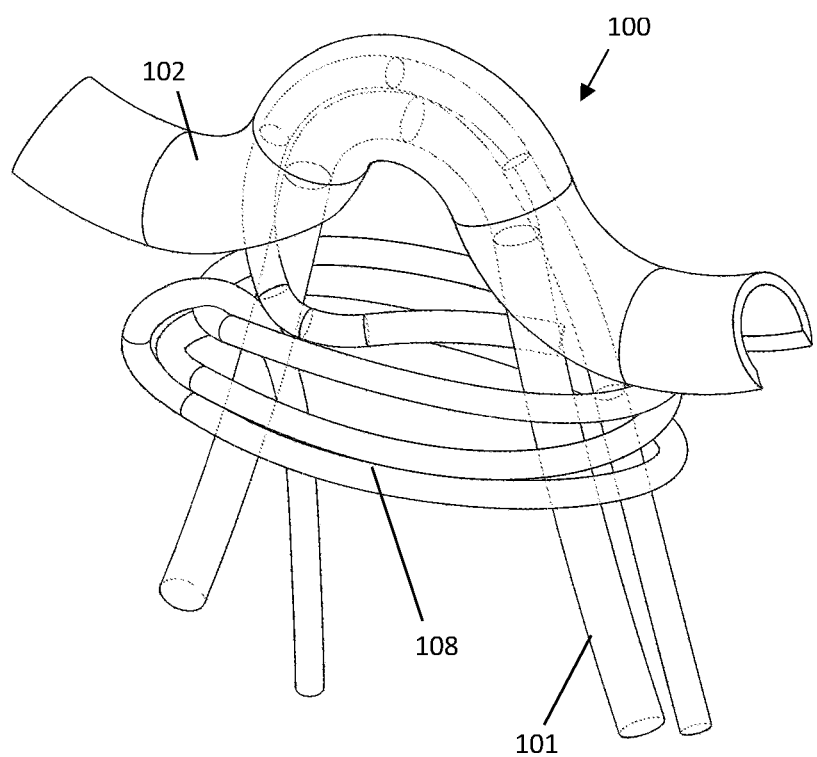
FIG. 1D is a perspective view of the anchor of FIG. 1C with an alternative locking loop depicted.

In FIG. 1D, the locking loop 108 includes one or more wraps around the tails of the working suture 101. With this embodiment, prior to activating the locking loop 108, the working suture can slide within the wrap or wraps. When activated, the locking loop closes around both legs of the working suture to prevent movement and lock the tensioned working suture in position.

Figure 1E:
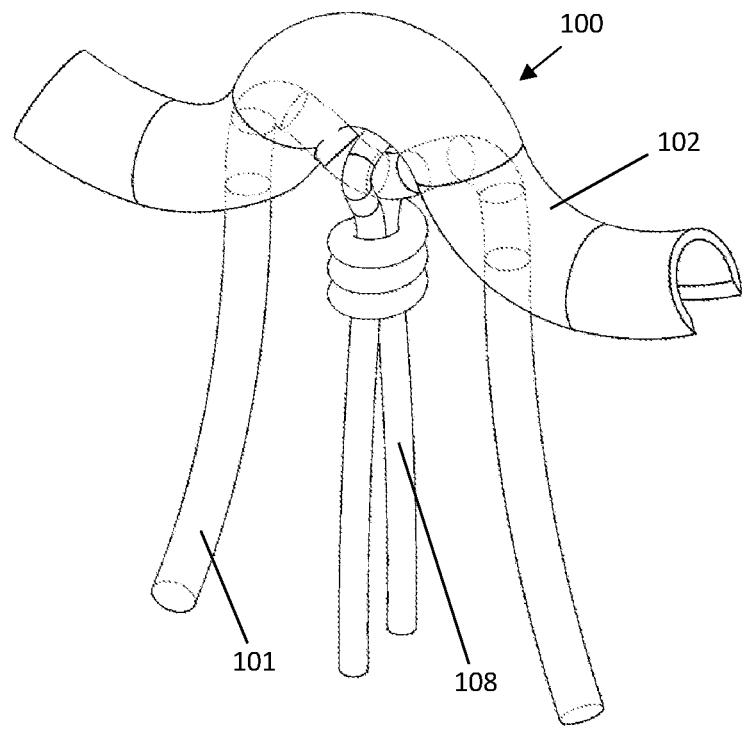
FIG. 1E is a perspective view of another alternative locking loop in the locked position on an exemplary all-suture anchor.
Figure 1F:
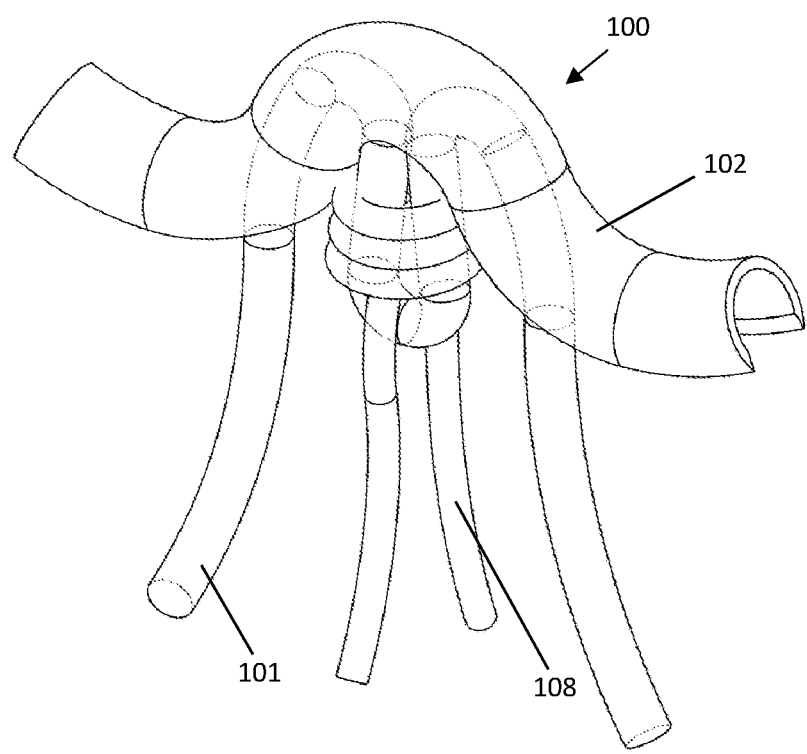
FIG. 1F is another perspective view of an alternative locking loop engaging a working suture.

In FIG. 1E, the locking loop is positioned to encircle the working suture through the cross section of the anchor member. As can be seen in the illustration, the working suture readily slides through the locking loop while it is in the open position, however, when the locking loop is closed or tightened around the working suture, it is effectively locked from moving relative to the anchor member. FIG. 1F depicts a slightly different design for the locking loop of FIG. 1E. In particular the loop passes round around the working suture at two locations such that closing of the locking loop pinches or crimps the working suture to prevent motion relative to the anchor member.

In other exemplary embodiments various designs of the anchor member 102 can be incorporated with various designs of the locking loop 108. Several examples of such variations are depicted in FIGS. 2A-2J. Elements of both features in the various designs can be selected for use in combination. The common features are as discussed above. Namely, a working suture is slidable or flossable with respect to an anchor member. The anchor member has a linear or longitudinal configuration for insertion into a small bone hole. Upon insertion, the anchor member is expanded by tensioning at least one of the legs of the working suture. As secured in the bone hole, the working suture is still slidable and can be tensioned so that the portion of the working suture extending to a previous anchor can be tightened to form a stitch that compresses the tendon to the bone. Once tensioned, each design includes a locking loop that can be activated to lock the tensioned working suture relative to the anchor member thus forming an independent tensioned and lock suture stitch.

Figure 2A:
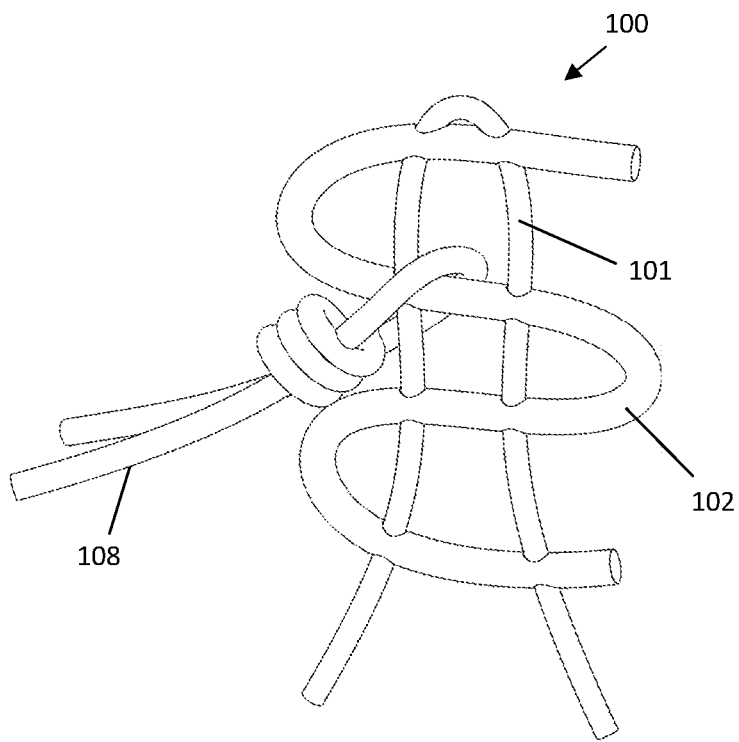
FIG. 2A is a perspective view of alternative soft anchor design.
Figure 2B:
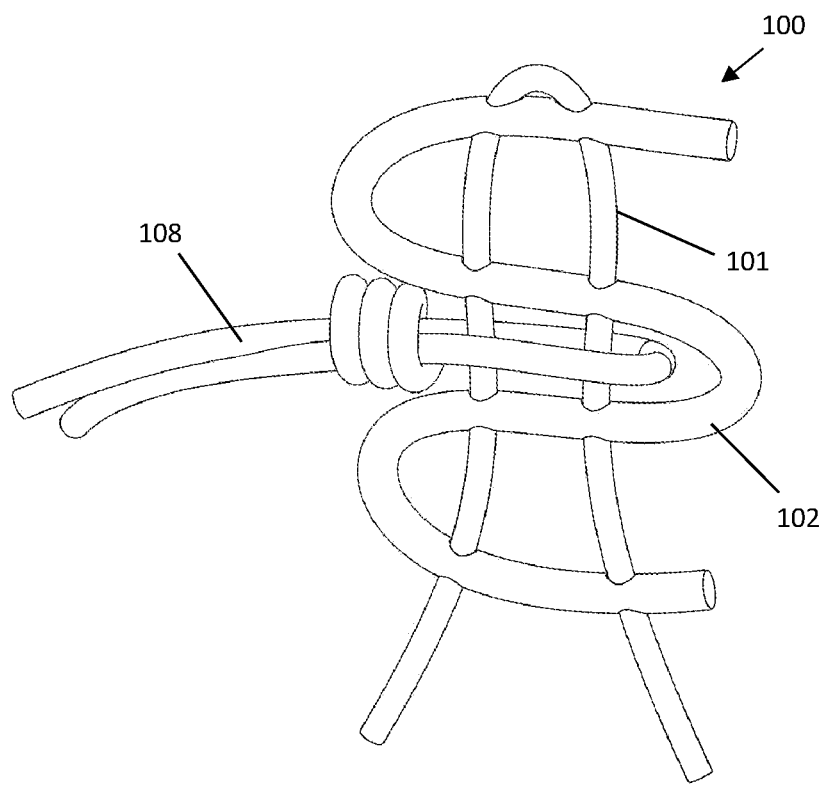
FIG. 2B is a perspective view of an alternative design for the anchor of FIG. 2A.
Figure 2C:
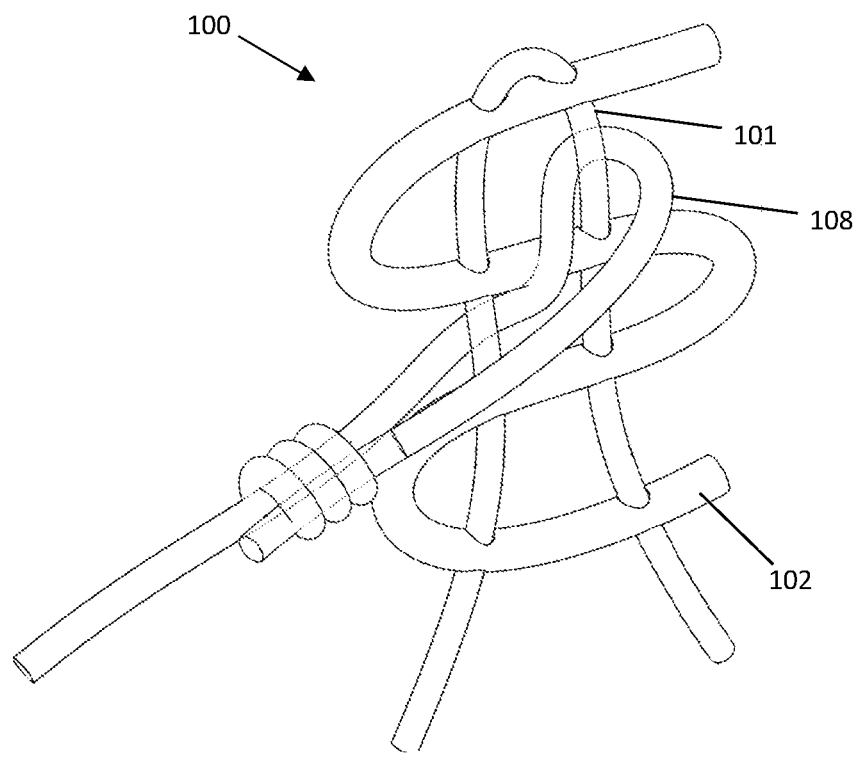
FIG. 2C is a perspective view of another alternative design for the anchor of FIG. 2A.

FIG. 2A depicts an anchor 100 that includes a working suture 101 that is routed slidably through the sidewalls or cross-section of an anchor member 102, that is also a suture member, in an accordion fashion. That is, here, the soft body of the anchor member 102 is in the form of a suture, such as a relatively larger diameter braided suture (the braid being relatively larger than the working suture 101 and/or the locking member 108). After insertion in a bone hole, the accordion like anchor member 102 collapses in the axial direction while under tension, and expands radially to retain the anchor member in the bone hole. As shown, the locking member 108 encircles at least a portion of both the working suture 101 and the anchor member 102. When tensioned, the locking loop 108 fixes the working suture 101 relative to the anchor member 102. FIG. 2B show the anchor of FIG. 2A with an alternative routing for the locking loop 108 which as shown encircles both legs of the working suture 101. When the locking loop is collapsed, the legs are pinched to prevent any motion relative to the anchor member. A third alternative routing for the locking loop is depicted in FIG. 2C wherein the locking loop 108 encircles both the anchor member and both legs of the working suture.

Figure 2D:
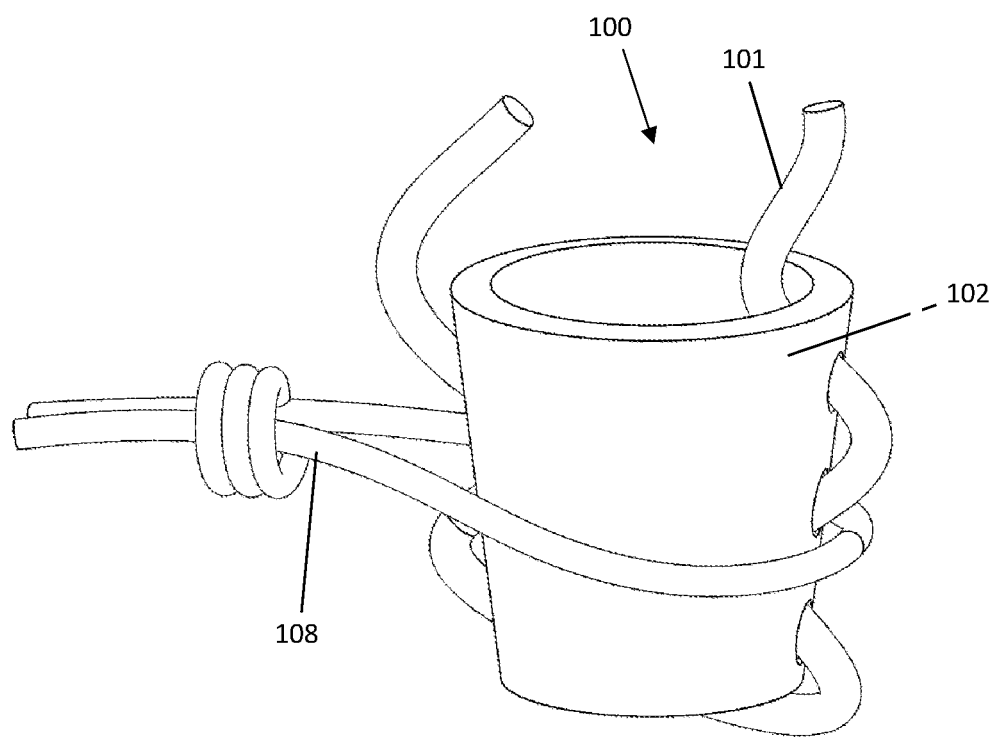
FIG. 2D is a perspective view of an anchor member incorporating a cylindrical design.
Figure 2E:
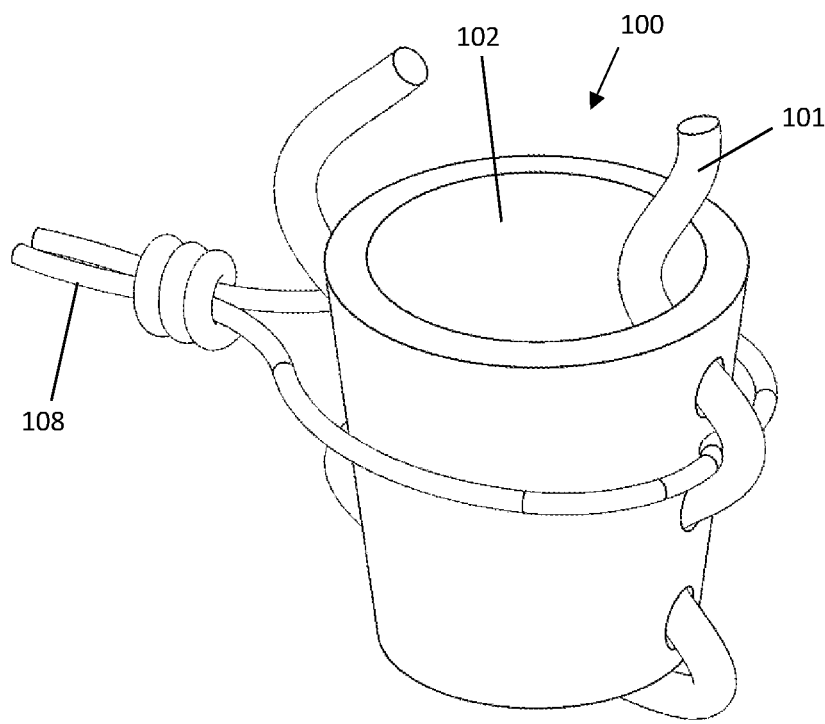
FIG. 2E is a perspective view of the anchor of FIG. 2D having an alternative locking loop design.
Figure 2F:
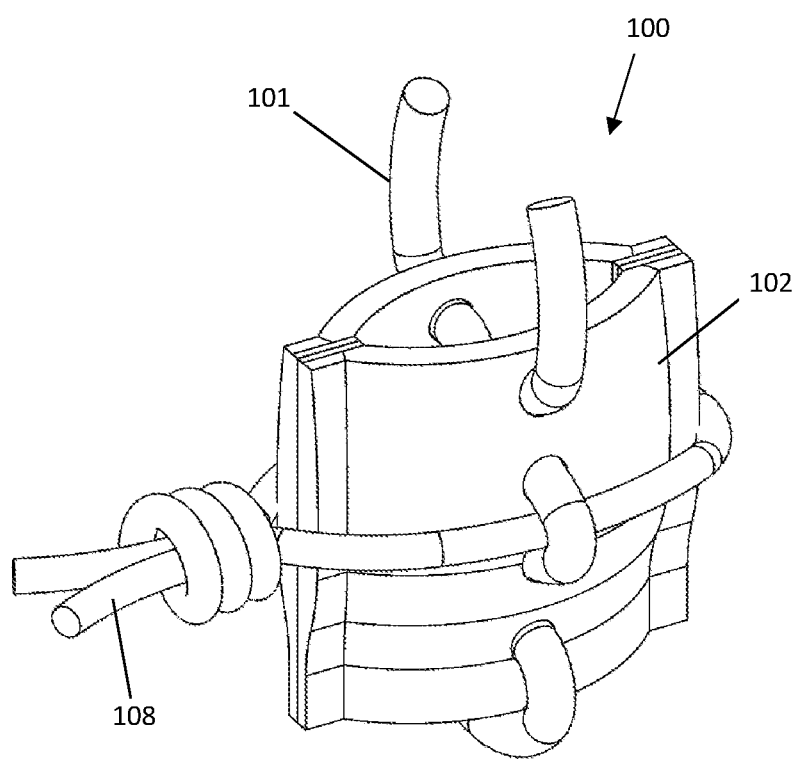
FIG. 2F is a perspective view of an anchor incorporating an envelope-like anchor member.
Figure 2G:
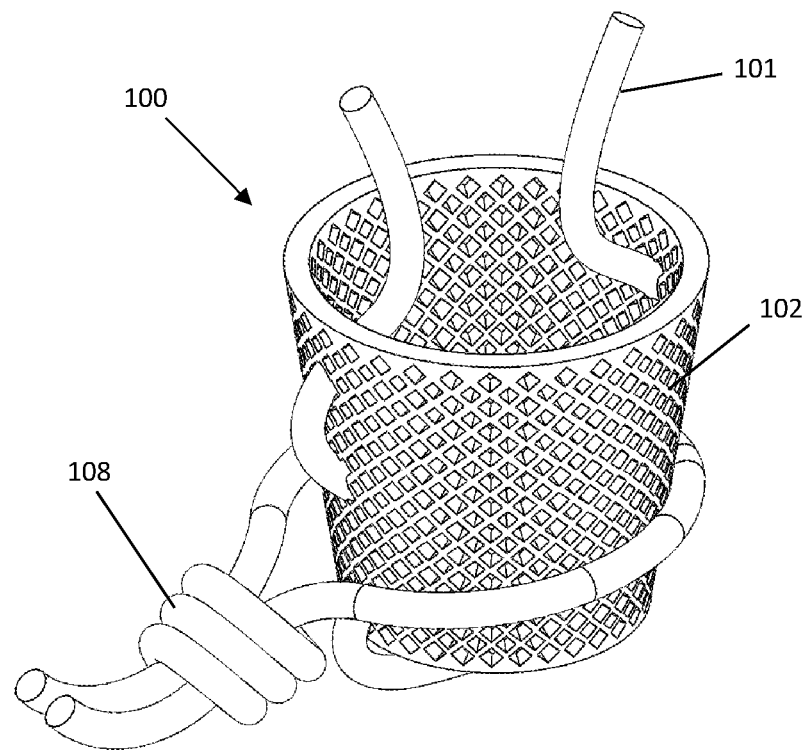
FIG. 2G is a perspective view of an anchor incorporating a basket-like anchor member.

FIG. 2D depicts another alternative anchor member 102 that is in the form of a collapsible and expandable flexible sleeve. The working suture 101 is interwoven through the wall of the anchor member 102 so that is slidable both in the anchor member's insertion configuration and in its implanted state. In this embodiment, the locking loop 108 encircles the anchor member 102. When the locking loop 108 is collapsed, the tortuous path for the working suture effectively locks the working suture relative to the anchor member. FIG. 2E shows an alternative routing of the locking loop 108 through the anchor member 102 of FIG. 2D. In this embodiment, at least one strand of the working suture is encircled by the locking loop 108. An alternative for the flexible sleeve locking member is depicted in FIG. 2F. This embodiment includes an anchor member in the form of a pouch or pocket 102 that can be inserted in the bone hole, then collapsed for retention therein. Likewise, a collapsible basket or woven structure and be used as an anchor member 108 as shown in FIG. 2G.

Figure 2H:
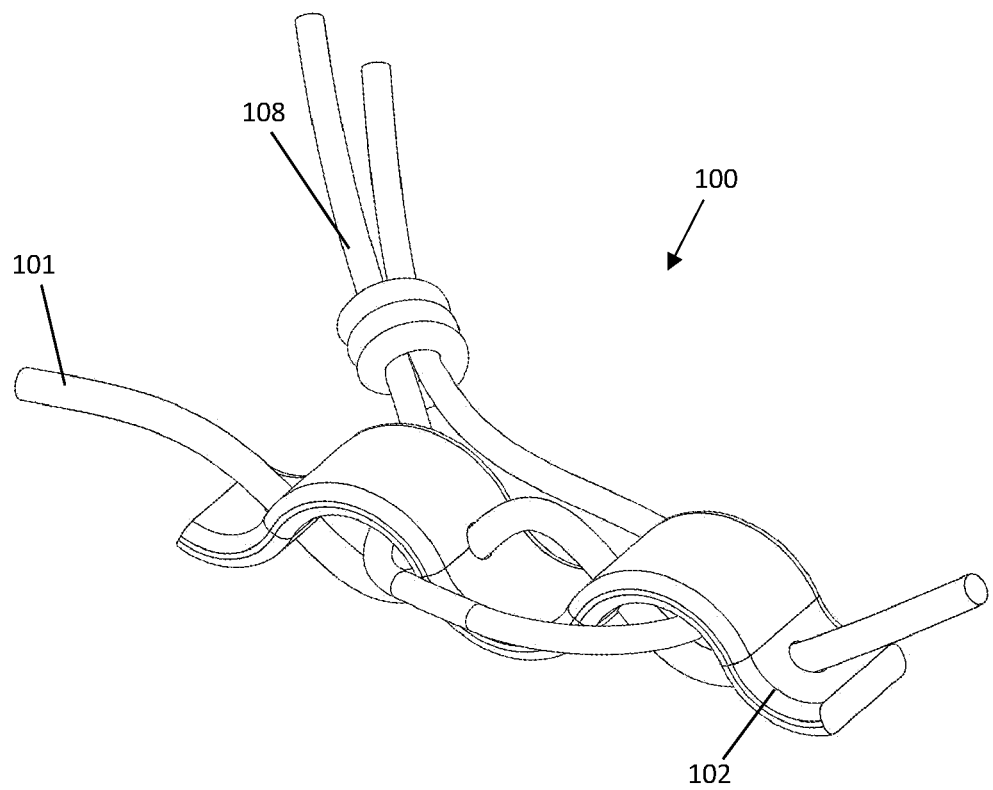
FIG. 2H is a perspective view of an anchor incorporating a woven strip anchor member.
Figure 2I:
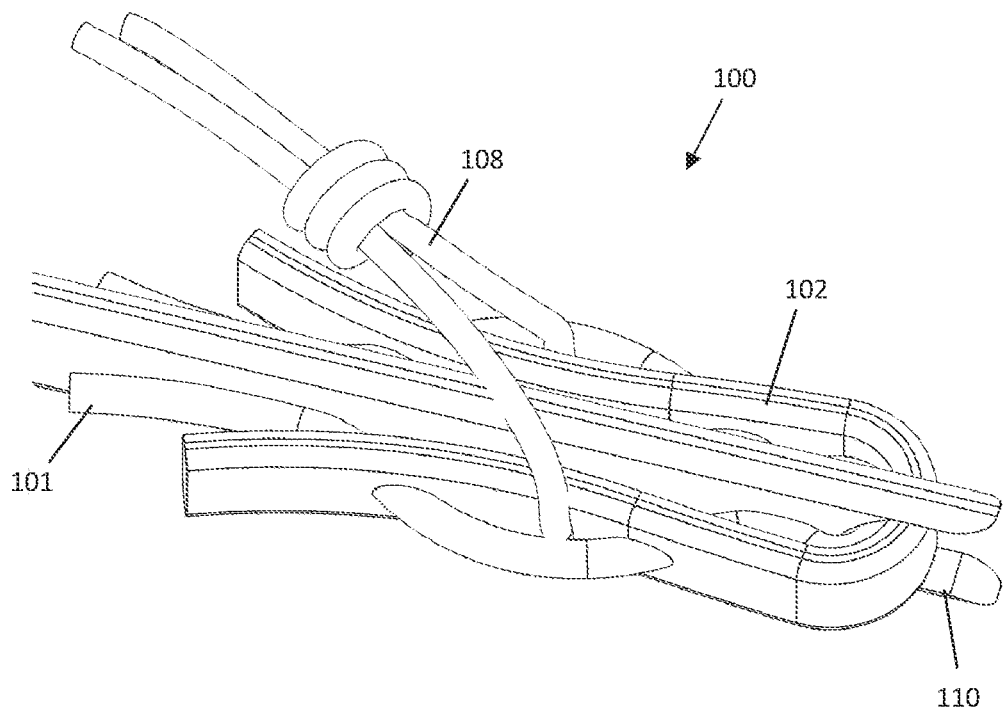
FIG. 2I depicts the anchor of FIG. 2H as mounted on a forked push rod for insertion in a bone hole.
Figure 2J:
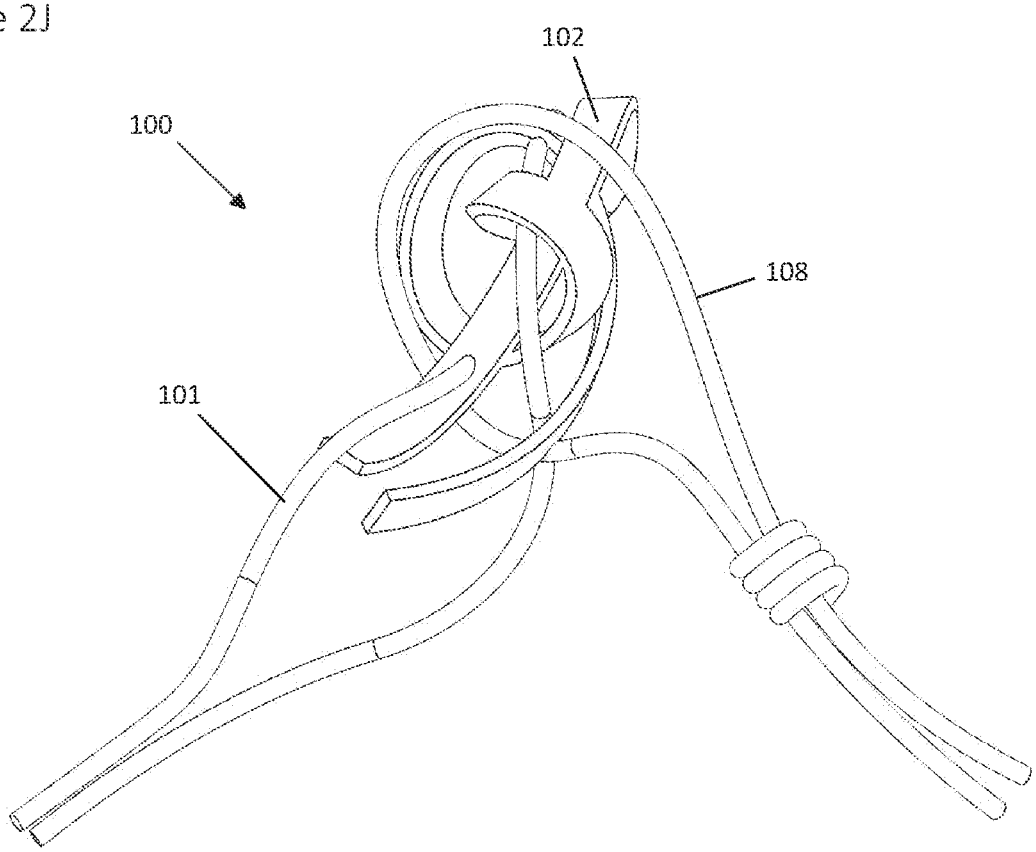
FIG. 2J depicts the anchor of FIG. 2I with the anchor member expanded radially.

In another embodiment, shown in FIGS. 2H-2J, the anchor member 102 can be a flat strip of flexible material or a woven tape structure that has the working suture woven therethrough. As with other embodiments, the locking loop 108 can be routed in and around either or both of the anchor member and working suture. As illustrated in FIG. 2I, a push rod 110 can be used to insert the anchor in a bone hole. The anchor readily flexes into a linear folded configuration to fit into the bone hole. Upon applying tension to one or both legs of the working suture, as shown in FIG. 1J, the flat strip expands radially to lock within the bone hole. In each embodiment, the closing of the locking loop 108 affixes the working suture relative to the anchor member as desired.

Figure 2K:
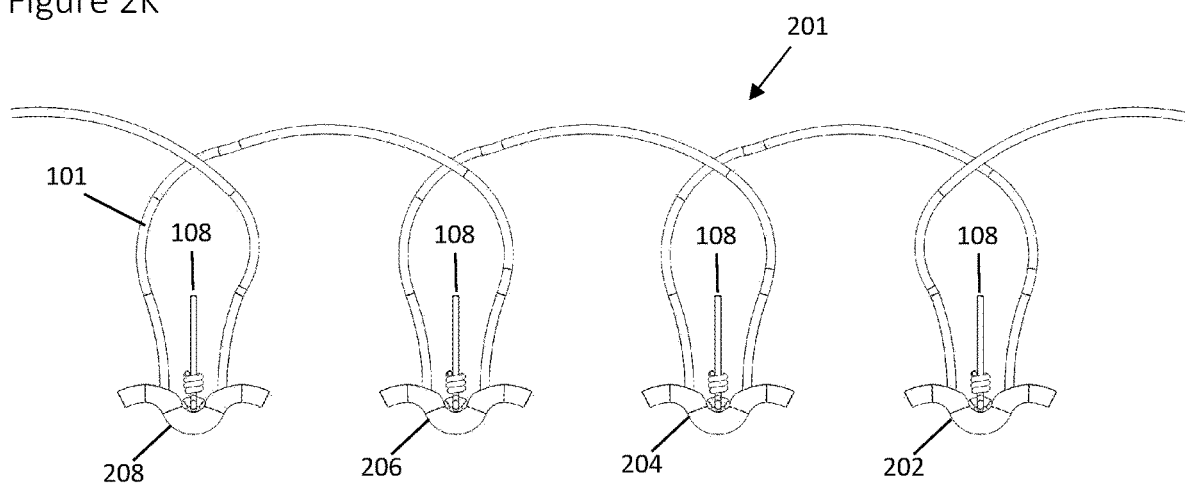
FIG. 2K depicts an array of representative soft anchors as pre-strung on a single working suture.

In some preferred embodiments, the above-described anchor embodiments do not function alone. Instead, any of the disclosed designs can be part of a pre-strung array of anchors having a common serially disposed working suture 101 therethrough. FIG. 2K illustrates a pre-strung array 201 using the anchor of FIG. 1C as an example. Each anchor 202, 204, 206, 208 can be implanted sequentially within the array, then the working suture section extending from the just implanted anchor to the just previously implanted anchor can be tensioned, then locked at the just implanted anchor so that a suture stitch between the two anchors provides force against the tendon to hold it in place much like a single sewn stitch. With the array, multiple continuous stitches can be formed similar to a sewn seam.

In FIG. 2K a pre-strung array 201 of individual anchors is depicted. The anchors 202, 204, 206, 208 may be similar in form and function to any of the anchor embodiments disclosed herein. The shown array has four anchors as a representative chain. It is believed chains of as few as 4 and as many as 12 anchors would be useful in tendon repair procedures such as rotator cuff repair depending on tear characteristics and surgeon preferences. One particular embodiment includes 8 anchors in an array. As depicted in FIG. 2K, the way in which the working suture 101 is pre-threaded through the series of anchors is important to assure that the anchor member will expand radially when the working suture leg running through the just implanted anchor to the prior anchor is tensioned while also passing the slack between anchors to form the secure stitch when the suture is tightened. The illustration shows the first anchor 202 to be implanted followed by the second anchor 204, then the third anchor 206 and finally the fourth anchor 208. With this order of implantation understood, the working suture 101 has been pre-threaded through the tubular sleeve forming the anchor member. The working suture 101 then continues to the second anchor 204 where it is threaded through the tubular sleeve of the second anchor. The working suture 101 then continues to the third anchor 206 where it passes through the sleeve of the third anchor and likewise through the fourth anchor. If the array were more than four anchors, the pre-threading would continue as described for each subsequent anchor.

One example of the relationship between the locking loop or locking suture and the working suture/anchor member combination is also depicted for each anchor in the array. The locking suture 108 is routed to encircle a portion of the working suture proximate the anchor member. Each locking loop is independent for each anchor. The locking suture 108 can have a preferential point of failure so that it can be tightened then purposefully broken off above the slidable knot. This can be accomplished by tying a knot in the free tail of the locking loop just above the slidable knot, or by creating a nick in the free tail or the locking loop just above the slidable knot. In some preferred embodiments the slidable knot is a 4-throw uni knot and the knot is in the free tail just above the uni knot. The suture is selected to break at a desired tension with the knot in place sufficient to lock the working suture. Tying of each knot may be performed as part of the assembly and/or manufacturing of the anchors, rather than being a task for the implanting physician, who may instead complete implantation without having to tie knots associated with placement of the anchors.

To create an implanted serial array of tensioned and independently locked anchor to anchor suture stitches for attaching a tendon to bone, a surgeon would begin with the pre-strung array 201 described in FIG. 2K. The first anchor 202 would be implanted through the tendon into a formed bone hole and the working suture locked. The second anchor 204 would then be implanted in close proximity to the first anchor 202, preferably less than 7 mm away (or less than about 10 mm center of bone hole to center of bone hole). The second anchor member is expanded radially and the working suture tensioned at the same time by pulling on the working suture 101 that exits the second anchor 204. Tension at this location not only locks the second anchor 204 in the bone hole but also tightens the working suture 101 going back to the first anchor 202 to form the tensioned stitch securely reapproximating the tendon against the footprint. The second anchor 204 is then locked so that the stitch remains tensioned and is isolated or independent of other stitches. The process is repeated for the third anchor 206 and fourth anchor 208 or more. In one preferred array, eight anchors are implanted and 7 tensioned and locked stitches in a continuous row are formed. Further, in a rotator cuff repair, multiple arrays can be implanted such as one array extending across the tendon in the medial portion of the footprint and a second array more lateral to the medial position.

Figure 3A:
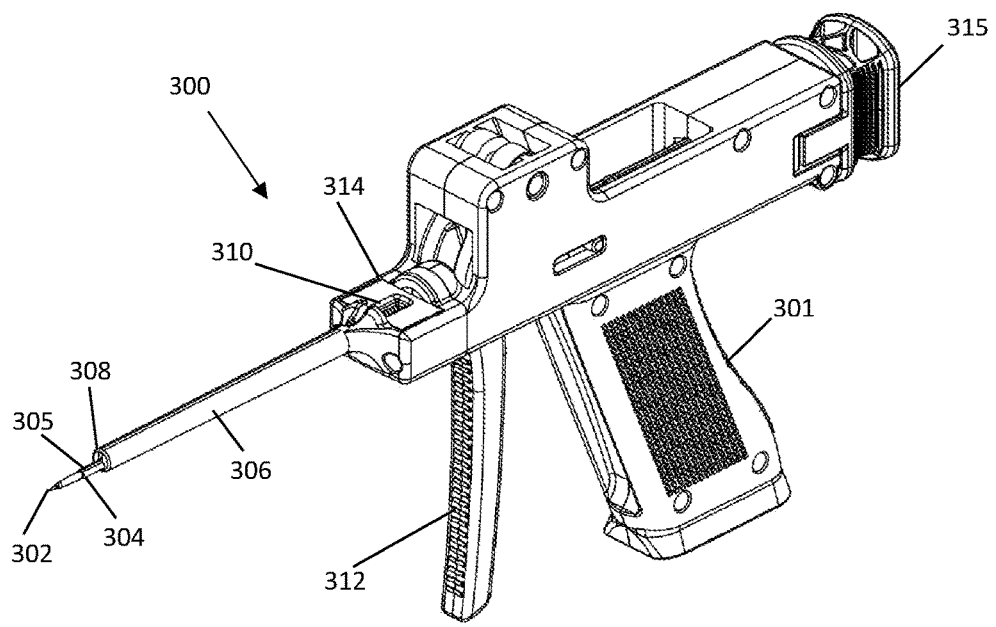
FIG. 3A is a perspective view of an example anchor delivery device.

One preferred anchor delivery device 300 for transtendinous implantation of individual anchors in an array is depicted in FIG. 3A. The delivery device 300 includes a handle assembly 301 having an outer tubular shaft 306 affixed thereto and extending distally therefrom. The outer tubular shaft 306 has a lumen extending through it. An anchor delivery tube 308 extends through the lumen of the outer tubular shaft 306 having a proximal end affixed to the handle assembly 301. The distal end of the anchor delivery tube 308 terminates distally at the same location as the outer tubular shaft 306. The distal end of the outer tubular shaft 306 along with the distal end of the anchor delivery tube 308 provide a surface that abuts the tendon when the anchor delivery device 300 is in position. It provides a bearing face that presses against the tendon and underlying bone which also counters the opposite force applied when the anchor is pulled into position. This reduces the chance of any anchor dislodging or pullout if being placed in relatively soft or fragile bone of a particular patient. Such counterforce may also avoid fracture of the bone around the bone hole during tensioning.

Figure 3B:
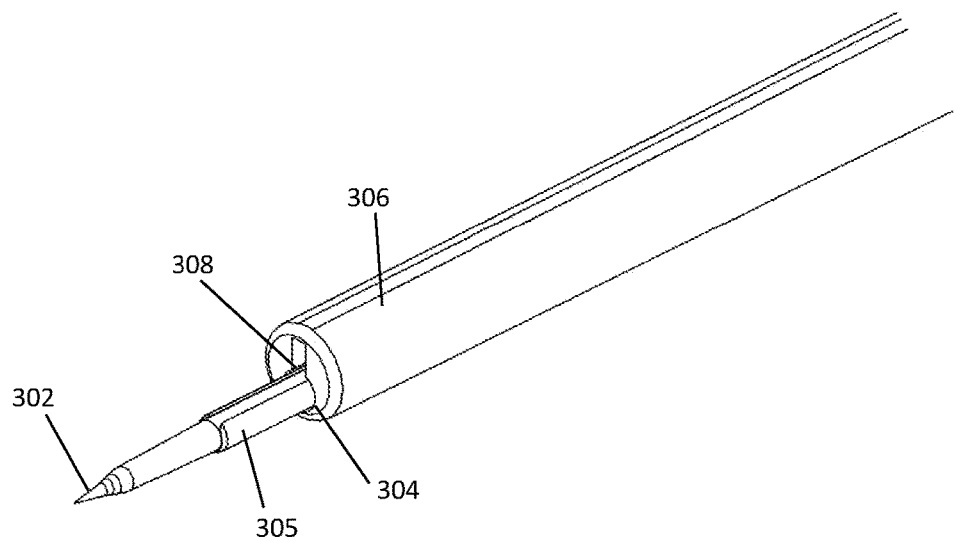
FIG. 3B is a close-up view of the distal end of the anchor delivery device of FIG. 3A showing the outer tube, delivery tube, nub, and bone punch relationship.

A spring-loaded or retractable nub assembly 304 having a distal nub portion extends within the anchor delivery tube 308 and has a distal nub portion 305 extending a distance distal of the anchor delivery tube 308. The distal nub portion 305 can be retractable within the anchor delivery tube 308 when force is applied to the distal end of the nub assembly or it is manually retracted via linkage within the delivery device. Further, a bone punch assembly 302 extends through the lumen of the anchor delivery tube 308 and the distal nub portion 305 with a pointed distal end terminating a distance distal of the distal end of the distal nub portion 305, wherein when fully inserted, a shoulder 314 on the bone punch assembly near the proximal end of the nub assembly blocks proximal movement or retraction of the nub portion 305, locking it in an extended position for insertion through the tendon into bone. The close-up view of the distal portion of the delivery device in FIG. 3B better shows the relationship of the outer tubular member 306, the anchor delivery tube 308, the nub assembly 304, distal nub portion 305, and bone punch 302. As can be seen, the distal end of the bone punch 302 extends beyond the distal nub portion 305 when fully extended for use in implantation.

Figure 3C:
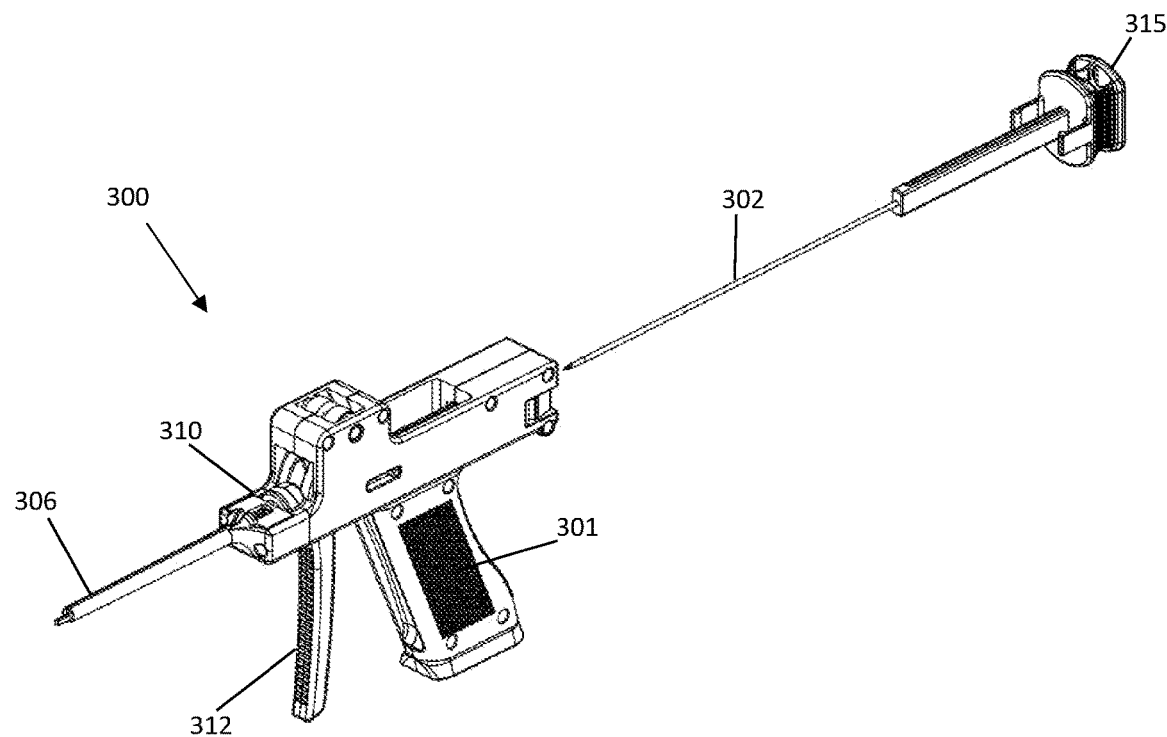
FIG. 3C is a perspective view of the delivery device of FIG. 3A with the bone punch retracted.

In some embodiments the anchor delivery tube 308 can include a longitudinal slot over its length to allow passage of sutures therethrough into the lumen of the outer tubular shaft 306. The outer tubular shaft 306 can preferably include a solid wall over its length. The delivery device also can include an anchor loading chamber 310 in communication with the proximal end of the anchor delivery tube 308 for receiving an anchor therein. With this embodiment the bone punch assembly 302 blocks the anchor loading chamber 310 when fully inserted and allows access to the chamber 310 when retracted. A delivery device with the bone punch assembly 302 retracted is shown in FIG. 3C. The bone punch assembly 302 has a proximal end extending from the delivery device with a flat surface 315 for pounding the extended punch into bone. Additionally, a trigger lever 312 is included on the delivery device that is connected via a linkage to the bone punch. When the trigger is pulled the linkage applies a retracting force to the bone punch assembly 302 to pull the punch from bone.

Figure 3D:
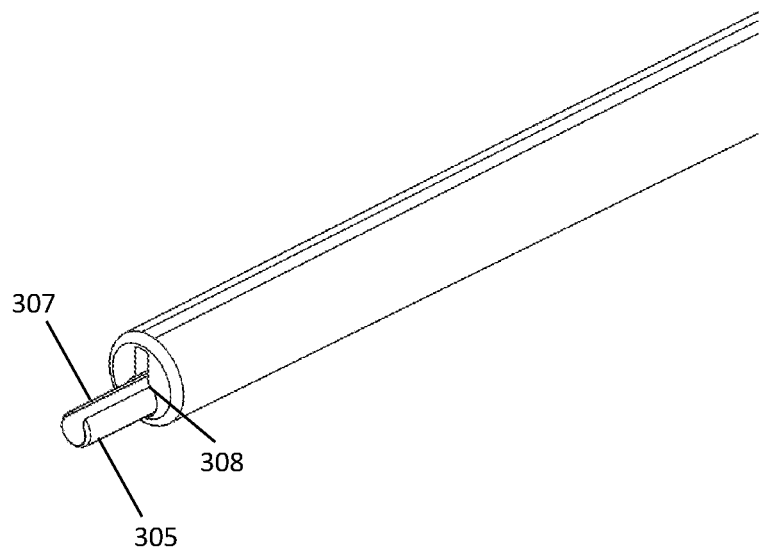
FIG. 3D is a closer view of the distal end of the delivery device of FIG. 3C showing the outer tube, delivery tube and nub relationship with the bone punch retracted.

Now referring to FIG. 3D, the distal end of the delivery device is shown with the bone punch retracted. As can be seen in the image, the distal nub portion 305 extends beyond the distal end of the anchor delivery tube 308 and outer tubular shaft 306. The distal nub portion 305 also includes a longitudinal slit 307 for passing a suture therethrough. The distal nub portion 305 can be semi-circular and may conform to the outer surface of the punch pin. It can have a thickness of about 0.0075 inches (0.19 mm) or less. With the bone punch retracted, the distal nub portion 305 is now able to move proximally into the anchor delivery tube 308 if a force is applied to the distal end of the nub assembly 304, such as through a linkage in the delivery device. This can be important as the distal nub portion 305 may adversely contact a soft anchor as the working suture is tensioned to expand the anchor member radially. If retracted, the nub does not interfere with anchor member expansion.

Figure 3E:
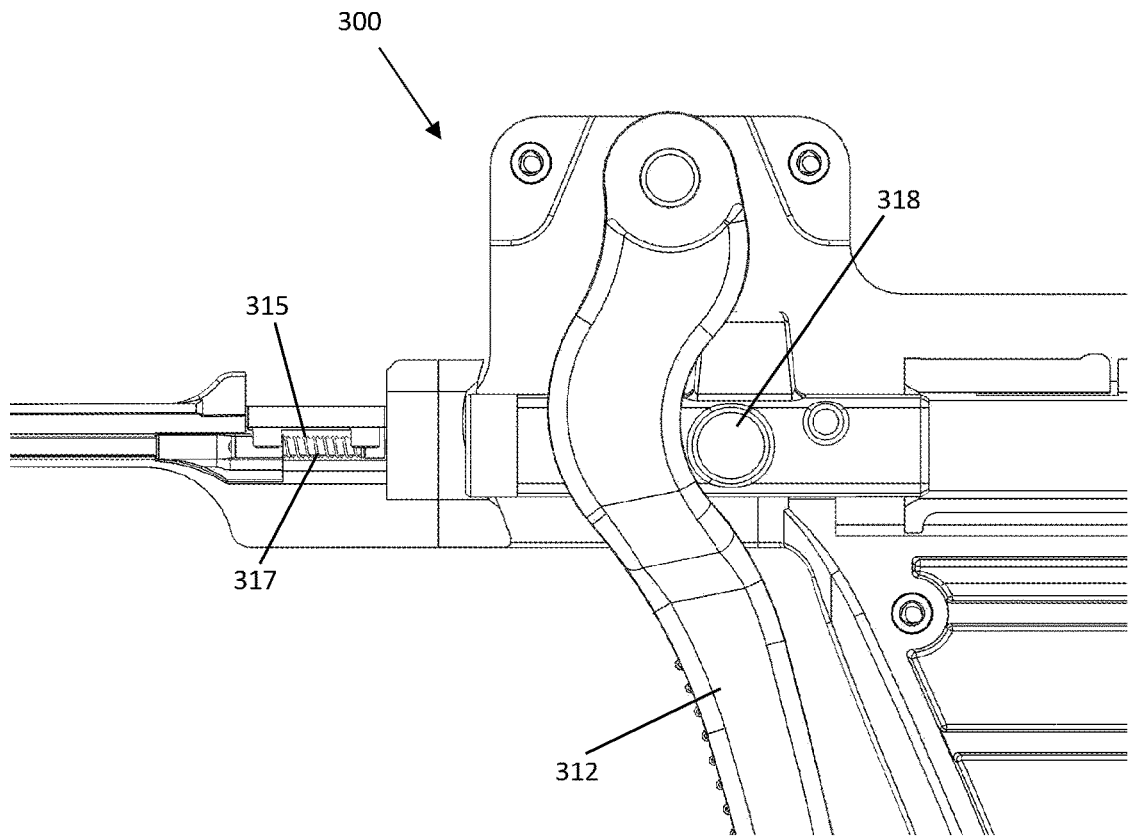
FIG. 3E is cross section view of the delivery device of FIG. 3A illustrating the mechanism to assist withdrawing the bone punch from bone and the unlocking of the nub.

More detail of the functioning of the delivery device is provided in FIG. 3E, which depicts a partial cross section view of the delivery device 300 in the portion that includes both the trigger mechanism and the proximal spring-loaded portion of the nub assembly. The pulled trigger 312 engages the punch pin boss 318 to move the entire punch pin assembly 302 proximally. Position of the nub assembly 305 may be controlled in any of several different ways.

In some examples, retraction of the punch pin assembly 302 may free the nub assembly 305 to move proximally against the resistive and restorative force of the spring. That is, once the punch pin assembly 302 is removed, the nub is then released generally. This approach may not fully secure the path to the bone hole, so other alternatives are also noted. It may be desirable instead to lock the nub assembly 305 in an extended position until the anchor is delivered, and to then actively retract the nub assembly 305 to prevent damage to the working suture or suture lock free tail during tensioning of the working suture and locking of the suture lock.

In one example, the nub assembly 305 is locked in an extended position as the punch pin assembly 302 is advanced. An anchor delivery tool designed for this step is disclosed in U.S. Prov. Pat. App. No. 63/281,411, filed Nov. 19, 2021, titled DELIVERY DEVICE FOR IMPLANTING KNOTLESS MICRO-SUTURE ANCHORS AND ANCHOR ARRAYS FOR ATTACHMENT OF SOFT TISSUE TO BONE. Next, the punch pin assembly is retracted at least away from the distal end of the delivery device 300. The anchor 100 is placed in an anchor delivery lumen, and the push rod 110 is advanced through the anchor delivery lumen to advance the anchor 100 to position. For example, the anchor delivery tool 300 may have a punch pin lumen and an anchor delivery lumen extending side-by-side throughout most of the length of the outer tubular shaft 306, with the two lumens joined together in a distal lumen segment, with the distal lumen segment aligned with the interior of the nub 305. The punch pin assembly 302 would then be retracted into the punch pin lumen, out of the way of the distal lumen segment. The push rod 110 would be pulled back to the handle assembly 301 to allow an anchor to be introduced at 310, and is advanced with the anchor through the anchor delivery lumen, the distal lumen segment, and the nub to place the anchor in position inside the bone. The push rod 110 would then be retracted. As the push rod is retracted, both the push rod and the nub may be pulled back into the outer tubular shaft. To do so, the push rod 110 may engage with a mechanism in the handle assembly 301 that releases the lock on the nub.

In another example, the anchor delivery tool may be similar to that disclosed in U.S. Prov. Pat. App. No. 63/281, 411, filed Nov. 19, 2021, titled DELIVERY DEVICE FOR IMPLANTING KNOTLESS MICRO-SUTURE ANCHORS AND ANCHOR ARRAYS FOR ATTACHMENT OF SOFT TISSUE TO BONE, the disclosure of which is incorporated herein by reference. In this example, the bone punch may be completely removed from the handle assembly 301 to allow insertion of the push rod 110 therethrough. Using the design of the 63/281,411 Provisional Application, the removal of the bone punch would leave the nub assembly in an extended and locket position. An anchor would be introduced into the anchor delivery tube using a plunger as disclosed in the 63/281,411 Provisional Application, and the push rod advanced to press the anchor down the anchor delivery tube to complete the implantation of the anchor. As disclosed in the 63/281,411 Provisional Application, the trigger would be actuated to retract both the push rod and the nub under active force into the distal end of the elongated tube 306.

In some examples, the anchor may be held in a collapsed position by the anchor delivery device and may expand under its own elastic forces when passed through the nub portion 305, either by passage out of the distal end of the nub, or when the nub is retracted, releasing the compressed soft anchor. The anchor may instead be expanded by application of force by the working suture as tension is applied, causing the anchor to expand; again, such force may be applied with the nub in place, or after retraction of the nub portion 305. In some examples, the anchor expands under its own forces when released from the lumen of the anchor delivery device and the inner sidewalls of the nub portion 305 and is further encouraged to expand as the working suture 101 is tensioned.

Figure 3F:
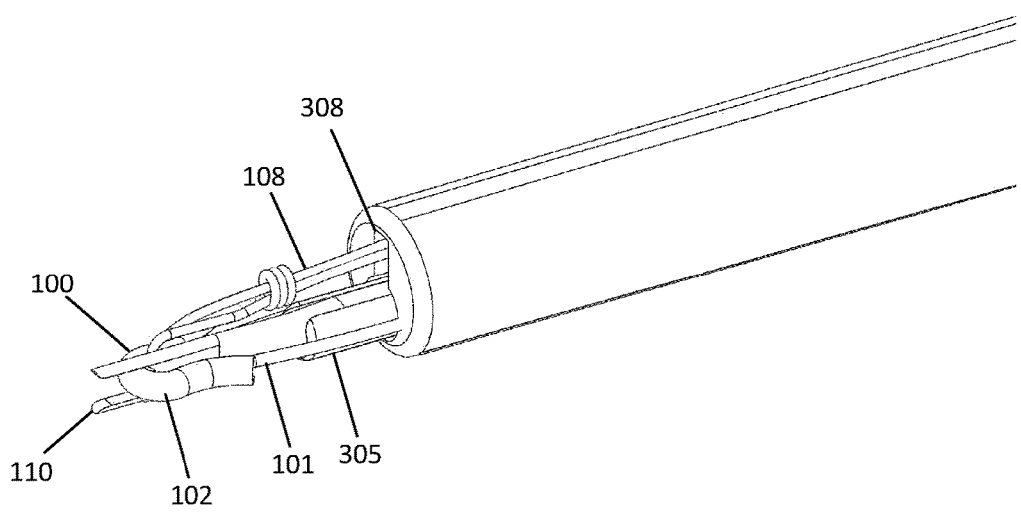
FIG. 3F is a closer view of the distal end of the delivery device and anchor of FIG. 3A; and, FIGS. 4A-4I illustrate the steps for implanting exemplary anchors of the current invention and resulting pattern of continuous tensioned and locked anchor to anchor single suture stitches.

FIG. 3F depicts the distal portion of the delivery device described above as it functions to deliver a soft anchor 100 as described in the many embodiments disclosed above. In particular the illustration depicts the distal portion of a push rod 110 that is used to push the soft anchor 100 (which is held in a generally linear, compressed configuration) out the end of the delivery instrument into a bone hole. As can be seen, the anchor member 102 is folded over the push rod 110 with the working suture 101 routed therethrough with tails extending up into the delivery instrument. That is, the working suture 101 may pass through the longitudinal slit 307 of the nub portion, while the inner sidewalls of the nub portion 305 retain the anchor member in a collapsed position under compressive forces. The locking loop 108 is routed as desired to encircle at least a portion of the working suture proximate the anchor member. The free tail of the locking loop extends up the instrument to a location that can be reached by the surgeon during use.

In FIGS. 4A through 4G, an exemplary method for implanting both individual anchors and an array of anchors is depicted. Further, FIGS. 4H and 4I illustrate an example of suture stitch arrays as implanted on the surface of a rotator cuff tendon having anchor to anchor continuous stitches that are independently tensioned and locked that can result from using this technology.

Figure 4A:
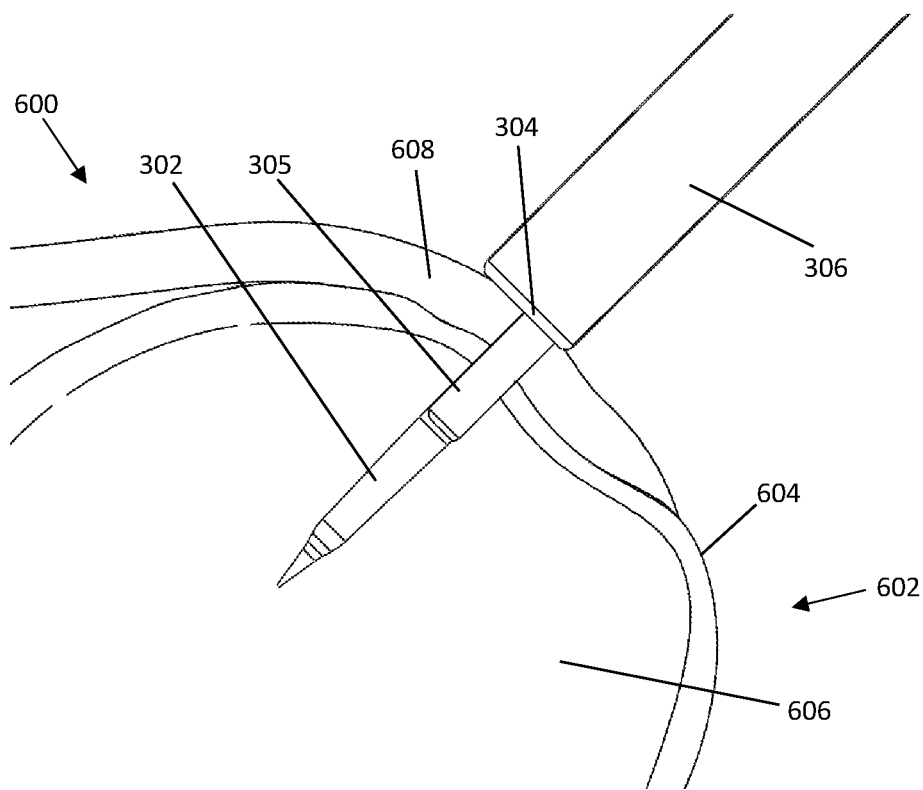

Referring first to FIG. 4A, a schematic of select parts of the shoulder rotator cuff 600 is depicted in order to explain the methods of implantation. The illustration includes a portion of the humeral head 602 shown including an outer cortical shell layer 604 and an inner cancellous bone material 606. A tendon, in this case the supraspinatus tendon 608 is shown overlaying a portion of the humeral head where it is to be attached to its anatomic footprint (i.e., insertion site). The method depicted is a transtendinous or through-the-tendon repair. The tendon 608 is first positioned in a desired location for reattachment to bone on the footprint of original attachment. The delivery device of FIGS. 3A-3F, or similar is then utilized to implant the soft suture anchor through the tendon 608. To begin the delivery device is set as in FIG. 3C with the distal nub 305 extending from the distal end of the implant delivery tube 304 and outer tubular member 306. The bone punch 302 is fully inserted distally so that it extends beyond the distal end of the nub 305 and is locked in place, as is the nub locked in place. The device as configured is positioned on the tendon at the desired anchor placement and inserted into the bone until the distal end of the outer tubular member is in contact with the tendon as shown in FIG. 4A. Insertion into the bone may be achieved by pressing the tool, or by tapping or pounding on the flat proximal end 315 of the bone punch 302. At this point the nub 305 extends through at least a portion of the cortical shell 604 (in thinner bone the nub 305 can extend into the cancellous bone 606) and the distal end of the bone punch 302 extends deeper into the cancellous bone 606. To achieve the desired depth of implantation to assure retention, the bone punch extends beyond the outer tube distal end a distance of greater than or equal to about 20 mm. Further, to assure nub registration with the bone hole, the nub portion 305 extends beyond the outer tube 306 distal end a distance of about 6 to about 10 mm.

Figure 4B:
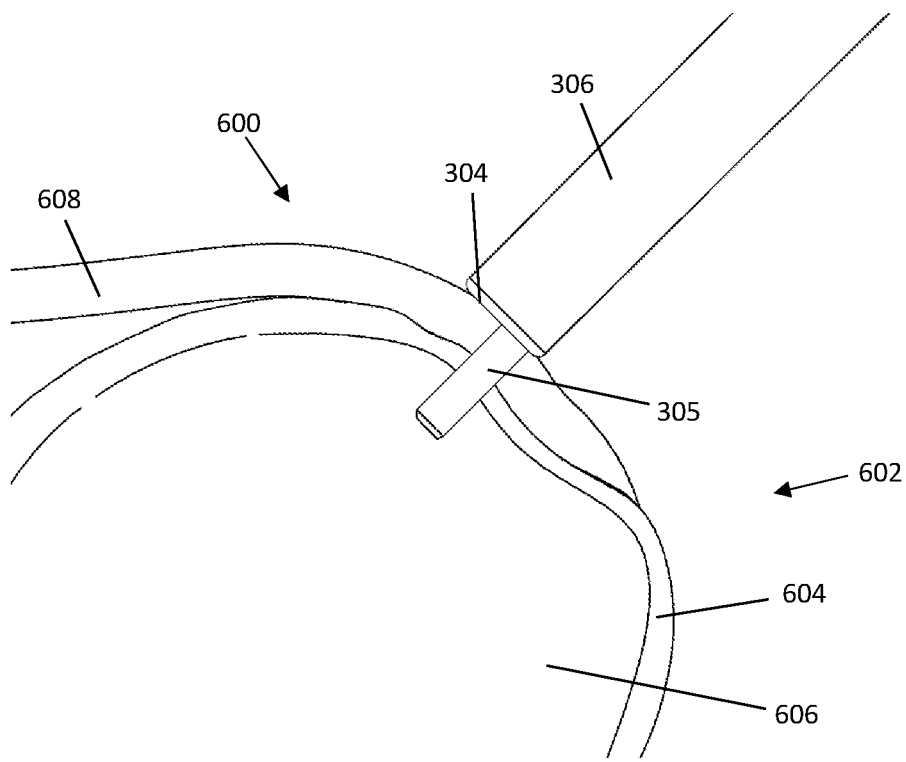

As depicted in FIG. 4B, the bone punch 302 is then retracted while maintaining the anchor delivery tube 304 and nub portion 305 in place, with the nub portion 305 providing registration with the formed hole in the bone. Absent such registration with the bone hole by the nub portion 305, the location under the tendon would be lost and it would be very difficult to feed an anchor through the tendon which would tend to fill the hole through which the bone punch traveled.

Figure 4C:
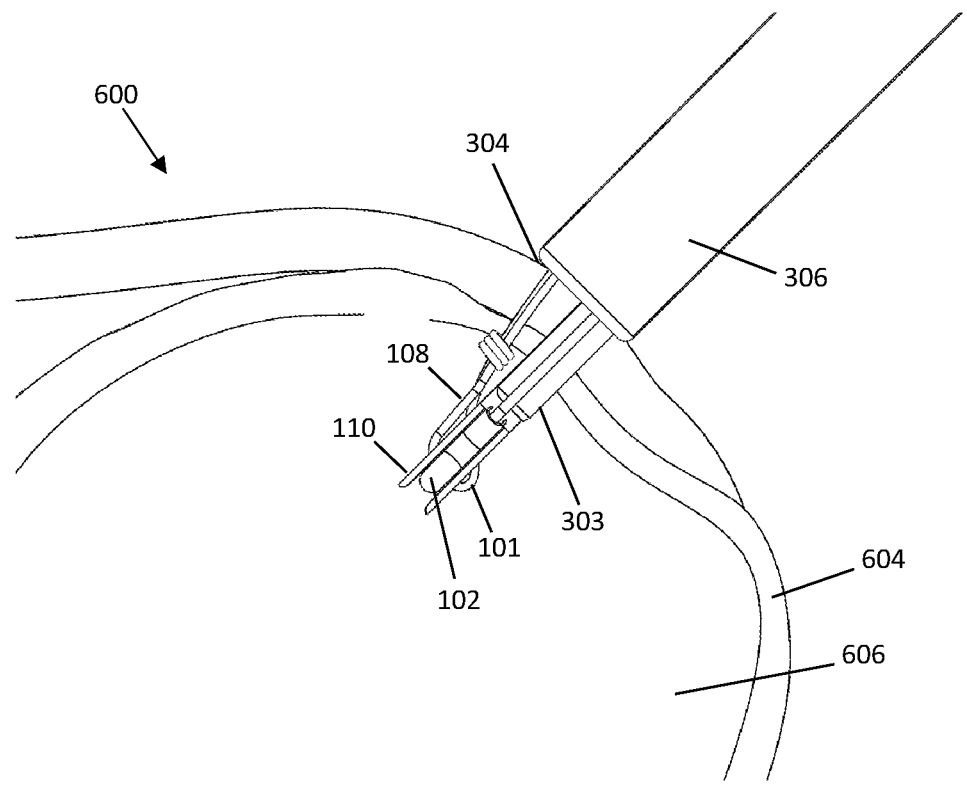
Figure 4D:
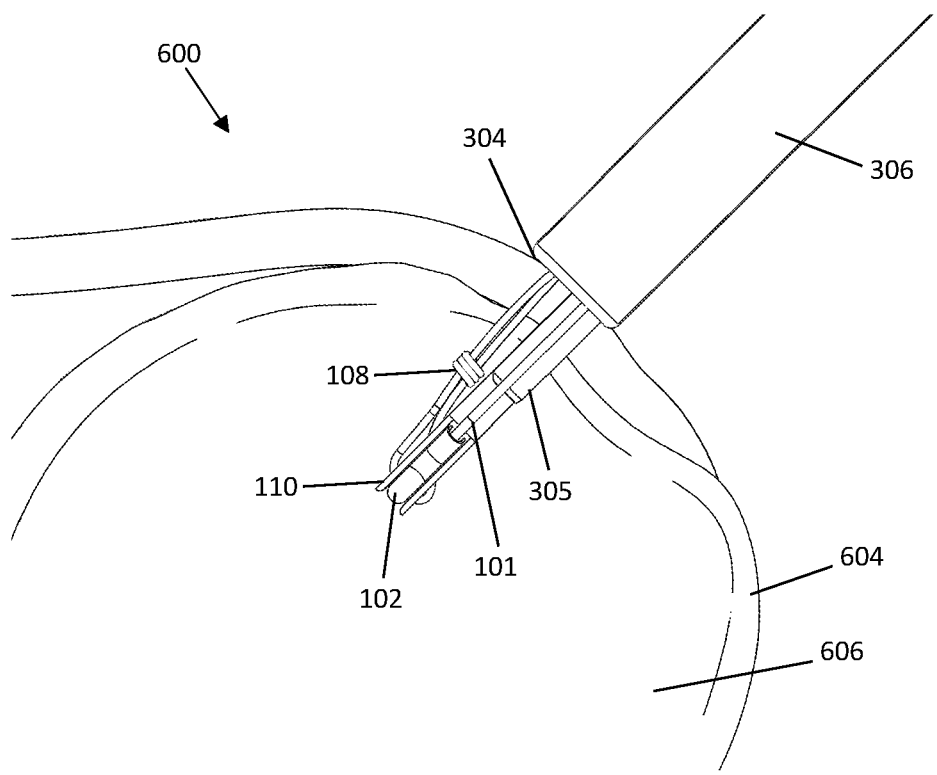

The first anchor is transferred or inserted into the proximal portion of the anchor delivery tube 306. As shown in FIG. 4C, a push rod 110 having forked distal end for engaging the soft anchor is then inserted into the lumen of the anchor delivery tube 304 and advanced distally. As shown in FIG. 4C, the anchor is pushed out the distal end by the push rod 110 with the anchor member 102, working suture 101 and locking loop 108 pre-strung as discussed above. The push rod 110 continues to be advanced in the distal direction to its full depth, as shown in FIG. 4D, to push the soft anchor into the bone. It has been found that pushing the proximal end of the anchor deep into the bone assures anchor retention, especially in thick cortical shell bone.

Figure 4E:
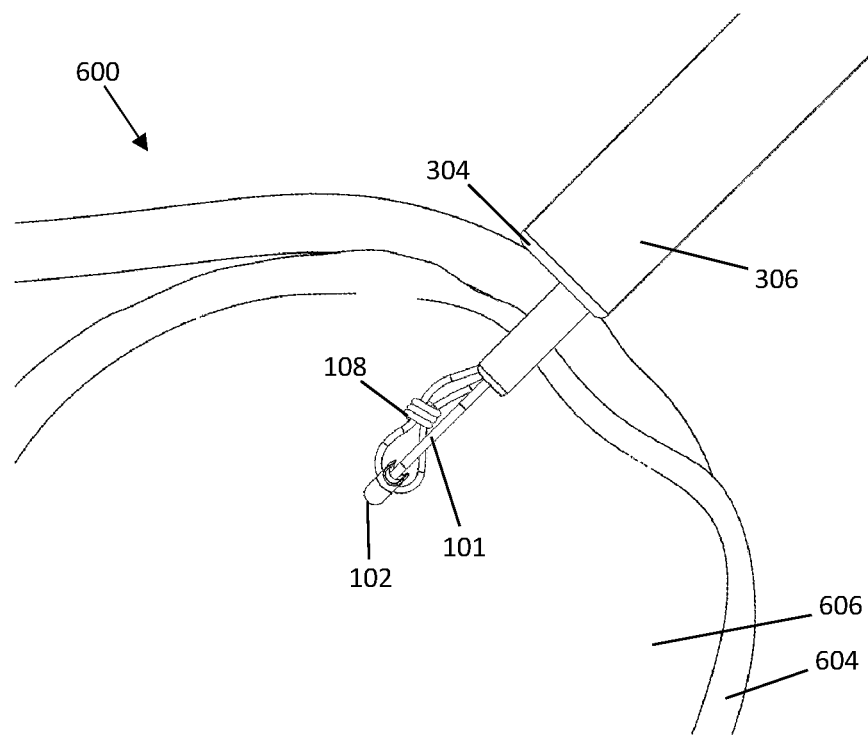

As shown in FIG. 4E, the push rod is then retracted. It is important to note that retracting the push rod also unlocks the nub 305 so that it can retract if there is force on it from positioning the implant. In some examples, as described above, the nub 305 may be actively retracted during the retraction of the push rod to ensure it is out of the way. This assures the nub 305 does not cut or fray the working suture and/or the free end of the locking loop.

Figure 4F:
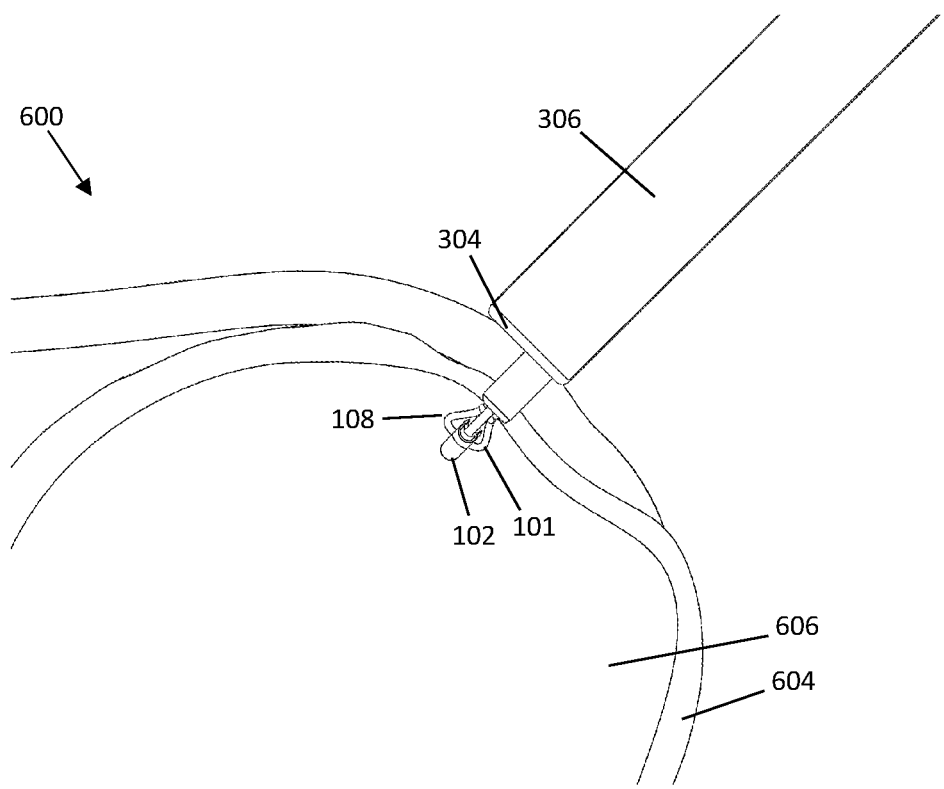
Figure 4G:
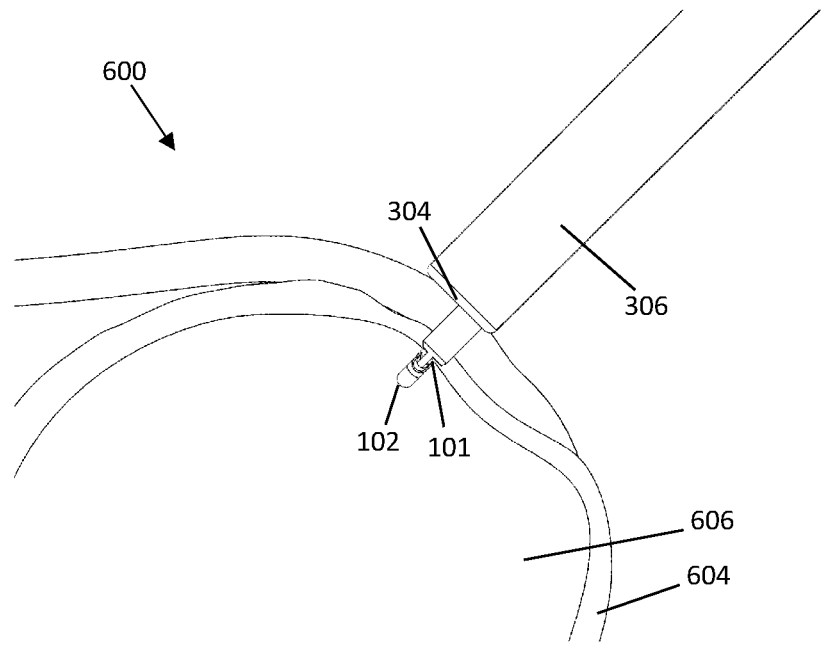
Figure 4H:
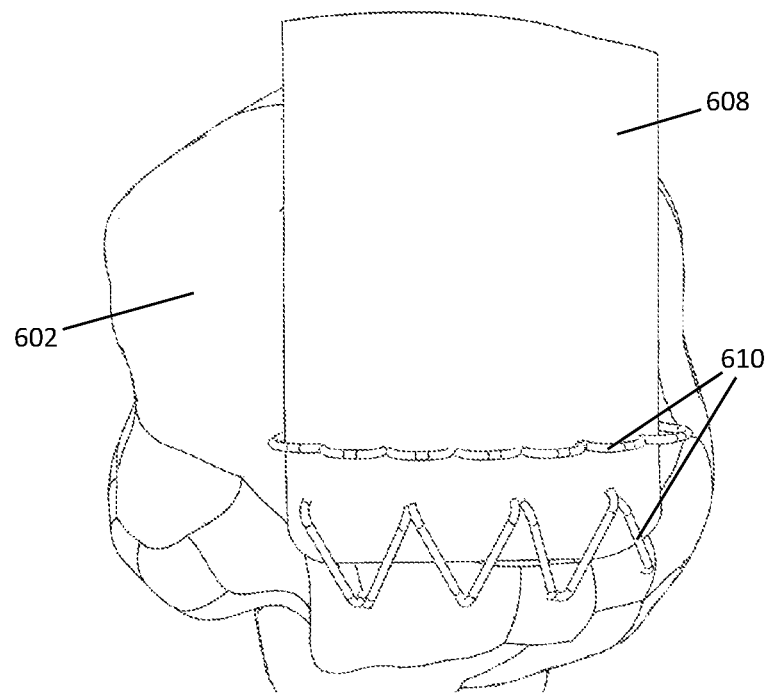
Figure 4I:
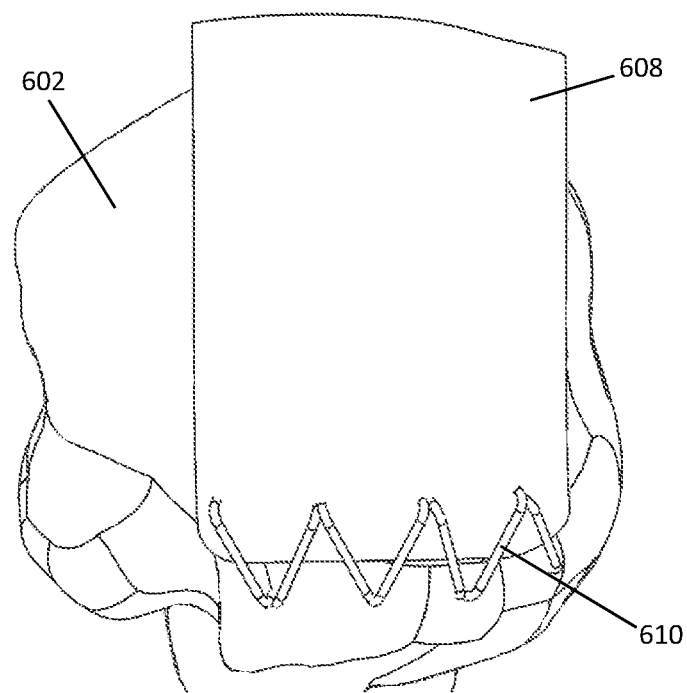

The distal portion of the working suture extending from the distal passage is then pulled to complete the radial expansion of the anchor member. This is shown in FIG. 4E. With continued tension on the working suture, the anchor 100 is pulled toward the undersurface of the cortical shell of the bone as shown in FIG. 4F. Because the nub portion 305 extends into the cancellous bone, the anchor causes it to retract proximally under spring loading so that the anchor can reach the cortical shell if necessary. As depicted in FIG. 4G, once the working suture 101 is tensioned, the locking suture is tensioned to close the locking loop 108 around the working suture 101 and fix or secure the working suture 101 relative to the anchor. It may be observed that FIGS. 4E to 4G show the nub in an extended position as the anchor is manipulated and tensioned; in other examples, the nub may be retracted into the elongated tube 306, if desired. In addition, it should be noted that pressure may be applied against the outer surface of the tendon using the outer tubular member 306 during manipulation of the working suture and suture lock to prevent backing out of the anchor and/or to prevent cortical shell fracture.

With implantation of the first anchor, the working suture 101 is simply locked as it cannot be tensioned to form a stitch until the second anchor is implanted. In some examples, the first anchor in a chain of anchors can be pre-locked for this purpose; in other examples the surgeon will lock the first anchor suture lock at the time of implantation. Therefore, in preferred methods, the second anchor is implanted repeating the above steps, except to the extent that the suture lock is differently engaged. More particularly, as the working suture is pulled to expand the anchor and tighten the stitch, the extra suture between the first and second anchors is pulled through to form the tensioned stitch. Once properly tensioned the second anchor is locked. These steps are repeated for the rest of the anchors in an array.

As shown in FIGS. 4H and 4I, using the above method and device can create a row of continuous stitches that are closely spaced, individually tensioned and tightened. A preferred pattern includes a row of stitches generally perpendicular to the direction of the tendon force as shown in FIG. 4H. In a rotator cuff repair these would be placed in the medial portion of the original tendon footprint. In some preferred embodiments a second row of anchors is also implanted, especially in a rotator cuff repair. The second row is implanted lateral to the first row and can include a zig zag pattern to put some anchors in the lateral portion of the original footprint and other lateral of the footprint to hold down edges of the repaired tendon. Other configurations are also possible depending on the size and shape of the tear. For example, on a small tear a single zig zag row of stitches could be used as shown in FIG. 4I.

While the above description focuses more or less on the attachment of a tendon to bone in rotator cuff repair, the same tools, anchors and methods may be used for any re-attachment of a tendon to bone, including in other joints and locations of the body.

In the above description, a plurality of different soft anchor bodies is described. In some examples, an anchoring system may comprise a plurality of soft anchor bodies that are each of a single type associated with a single working suture and a plurality of locking loops each corresponding to a soft anchor body. In some examples, an anchoring system may comprise a plurality of soft anchor bodies of different types and having a plurality of locking loops each corresponding to a soft anchor body. In such systems, there may be one locking loop for each anchor body, or there may be one or more soft anchor bodies that are permanently affixed on the working suture without a corresponding locking loop.

Additional features and alternative designs for various components, subassemblies and assemblies may be found in the following patent applications, each of which is incorporated herein by reference:

U.S. Prov. Pat. App. No. 63/172,564, filed Apr. 8, 2021, titled KNOTLESS MICRO SUTURE ANCHORS AND ANCHOR ARRAYS FOR ANATOMICAL ATTACHMENT OF SOFT TISSUE TO BONE, and U.S. patent application Ser. No. 17/551,588, filed on Dec. 15, 2021 and titled KNOTLESS MICRO SUTURE ANCHORS AND ANCHOR ARRAYS FOR ANATOMICAL ATTACHMENT OF SOFT TISSUE TO BONE.

U.S. Prov. Pat. App. No. 63/172,613, filed Apr. 8, 2021, titled KNOTLESS MICRO SUTURE ANCHOR ARRAY FOR HIGH DENSITY ANATOMICAL ATTACHMENT OF SOFT TISSUE TO BONE, and U.S. patent application Ser. No. 17/551,728, filed on Dec. 15, 2021 and titled KNOTLESS MICRO SUTURE ANCHOR ARRAY FOR HIGH DENSITY ANATOMICAL ATTACHMENT OF SOFT TISSUE TO BONE.

U.S. Prov. Pat. App. No. 63/172,614, filed Apr. 8, 2021, titled METHOD FOR CREATING A TENSIONABLE AND LOCKABLE SUTURE ANCHOR ARRAY FOR ANATOMICAL ATTACHMENT OF SOFT TISSUE TO BONE, and U.S. patent application Ser. No. 17/551,779, filed on Dec. 15, 2021 and titled METHOD FOR CREATING A TENSIONABLE AND LOCKABLE SUTURE ANCHOR ARRAY FOR ANATOMICAL ATTACHMENT OF SOFT TISSUE TO BONE.

U.S. Prov. Pat. App. No. 63/172,629, filed Apr. 8, 2021, titled DELIVERY DEVICE FOR IMPLANTING KNOTLESS MICRO-SUTURE ANCHORS AND ANCHOR ARRAYS FOR ATTACHMENT OF SOFT TISSUE TO BONE, and U.S. Prov. Pat. App. No. 63/281,411, filed Nov. 19, 2021, titled DELIVERY DEVICE FOR IMPLANTING KNOTLESS MICRO-SUTURE ANCHORS AND ANCHOR ARRAYS FOR ATTACHMENT OF SOFT TISSUE TO BONE, and U.S. patent application Ser. No. 17/551,811, filed on Dec. 15, 2021 and titled DELIVERY DEVICE FOR IMPLANTING KNOTLESS MICRO-SUTURE ANCHORS AND ANCHOR ARRAYS FOR ATTACHMENT OF SOFT TISSUE TO BONE.

U.S. Prov. Pat. App. No. 63/172,624, filed Apr. 8, 2021, titled CARTRIDGE DEVICE FOR SUTURE ANCHOR AND SUTURE MANAGEMENT DURING IMPLANTATION OF A MICRO SUTURE ANCHOR ARRAY, and U.S. patent application Ser. No. 17/551,838, filed on Dec. 15, 2021 and titled CARTRIDGE DEVICE FOR SUTURE ANCHOR AND SUTURE MANAGEMENT DURING IMPLANTATION OF A MICRO SUTURE ANCHOR ARRAY.

U.S. Prov. Pat. App. No. 63/172,568, filed Apr. 8, 2021, titled LOCKING SUTURE CONSTRUCT FOR TENSIONED SUTURE TO SUTURE BRIDGES IN ANCHOR ARRAYS FOR ATTACHING SOFT TISSUE TO BONE and U.S. patent application Ser. No. 17/551,860, filed on Dec. 15, 2021 and titled LOCKING SUTURE CONSTRUCT FOR TENSIONED SUTURE TO SUTURE STITCHES IN ANCHOR ARRAYS FOR ATTACHING SOFT TISSUE TO BONE.

U.S. Prov. Pat. App. No. 63/172,630, filed Apr. 8, 2021, titled METHODS FOR TRANSTENDINOUS IMPLANTATION OF KNOTLESS MICRO SUTURE ANCHORS AND ANCHOR ARRAYS, and U.S. patent application Ser. No. 17/551,885, filed on Dec. 15, 2021 and titled METHODS FOR TRANSTENDINOUS IMPLANTATION OF KNOTLESS MICRO SUTURE ANCHORS AND ANCHOR ARRAYS.

Each of these non-limiting examples can stand on its own or can be combined in various permutations or combinations with one or more of the other examples.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

The above description is intended to be illustrative, and not restrictive. For example, the above-described examples (or one or more aspects thereof) may be used in combination with each other. Other embodiments can be used, such as by one of ordinary skill in the art upon reviewing the above description.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed:

1. A soft suture anchor system that can be tensioned and locked comprising:
    a single length of working suture with two tails extending therefrom;
    a first soft anchor body and a second soft anchor body each implantable in a separate bone hole and each having the working suture slidably disposed therethrough, wherein upon tensioning both working suture tails while implanted, each soft anchor body expands within its bone hole while the working suture remains slidably disposed in each expanded anchor body; and
    a first locking loop associated with the first soft anchor body and a second locking loop associated with the second soft anchor body, each locking loop encircling a portion of the working suture, each locking loop having a first position allowing the working suture to slide through the locking loop and a second position engaging the working suture to frictionally prevent sliding of the working suture within the locking loop and its associated soft anchor body, wherein each locking loop is a separate piece from the length of working suture.

2. The soft suture anchor of claim 1, wherein at least one of the soft anchor bodies is a sleeve of hollow suture through which the length of working suture is slidably disposed.

3. The soft suture anchor of claim 2, wherein the working suture tails exit a sidewall of the sleeve.

4. The soft suture anchor of claim 1, wherein at least one of the soft suture anchor bodies is a length of braided strands into which the working suture is woven.

5. The soft suture anchor of claim 1, wherein at least one of the soft suture anchor bodies is a second length of suture with the working suture passing through a sidewall of the second length of suture at least four times to form accordion like folds.

6. The soft suture anchor of claim 1, wherein at least one of the soft suture anchor bodies is a collapsible elongate cylinder having the working suture tails woven in and out of the cylinder side walls.

7. The soft suture anchor of claim 1, wherein at least one of the soft suture anchor bodies is a collapsible ring with the working suture tails woven in and out of the collapsible ring.

8. A system of soft suture anchors connected serially, the system comprising:
    a single working suture;
    a plurality of soft anchor bodies each having first and second ends, each soft anchor body slidably disposed on the single working suture with a length of the working suture extending from each of the first and second ends of the soft anchor bodies to form first and second tails extending from the first and second ends of each soft anchor body, wherein each soft anchor body is implantable in a formed bone hole, wherein upon tensioning both first and second suture tails while implanted, each soft anchor body expands within the bone hole while the working suture remains slidably disposed in each expanded anchor bodies; and
    a plurality of locking loops each corresponding to one of the plurality of soft anchor bodies, each locking loop being a separate piece from the working suture and encircling a portion of the working suture, each locking loop having a first position allowing the working suture to slide through one of the plurality of locking loops and corresponding soft anchor body, and a second position engaging the working suture to frictionally prevent sliding of the working suture within the locking loop and corresponding soft anchor body.

9. The soft suture anchor of claim 8, wherein at least one soft anchor body is a sleeve of hollow suture through which the length of working suture is slidably disposed.

10. The soft suture anchor of claim 9, wherein the working suture tails exit a sidewall of the sleeve.

11. The soft suture anchor of claim 8, wherein at least one soft anchor body is a length of braided strands into which the working suture is woven.

12. The soft suture anchor of claim 8, wherein at least one soft anchor body is a second length of suture in a tubular form having a sidewall, and the working suture passes through the sidewall of the soft anchor body at least four times to form accordion like folds.

13. The soft suture anchor of claim 8, wherein at least one soft anchor body is a collapsible elongate cylinder having a side wall, and the working suture is woven in and out of the cylinder side wall.

14. The soft suture anchor of claim 8, wherein at least one soft anchor body is a collapsible ring with the suture tails woven in and out of the collapsible ring.

* * * * *